(12) United States Patent
Yachida et al.

(10) Patent No.: US 7,881,467 B2
(45) Date of Patent: Feb. 1, 2011

(54) IMAGE FORMING APPARATUS AND ELECTRONIZING METHOD FOR INFORMATION MENTIONED IN PAPER

(75) Inventors: Masuyoshi Yachida, Kanagawa (JP); Yoichi Kanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1362 days.

(21) Appl. No.: 11/184,944

(22) Filed: Jul. 20, 2005

(65) Prior Publication Data

US 2006/0020808 A1 Jan. 26, 2006

(30) Foreign Application Priority Data

Jul. 21, 2004 (JP) ............... 2004-213192

(51) Int. Cl.
H04N 1/44 (2006.01)
H04L 29/00 (2006.01)
G06F 21/00 (2006.01)

(52) U.S. Cl. .............. 380/246; 713/156; 713/185

(58) Field of Classification Search .......... 380/246, 380/287, 277, 243; 713/176, 155, 156, 157, 713/158, 161, 185; 726/28–30; 358/1.14, 358/1.15, 474; 705/67
See application file for complete search history.

(56) References Cited

U.S. PATENT DOCUMENTS

| | | | |
|---|---|---|---|
| 5,490,217 A * | 2/1996 | Wang et al. .............. 380/51 |
| 5,530,755 A * | 6/1996 | Pailles et al. ............ 713/179 |
| 5,598,473 A * | 1/1997 | Linsker et al. ........... 380/246 |
| 5,652,794 A * | 7/1997 | Lepetit et al. ............ 713/179 |
| 5,671,285 A * | 9/1997 | Newman .................. 705/78 |
| 5,926,550 A * | 7/1999 | Davis ..................... 713/176 |
| 6,862,583 B1 * | 3/2005 | Mazzagatte et al. ....... 705/64 |
| 7,181,017 B1 * | 2/2007 | Nagel et al. .............. 380/282 |
| 2002/0026583 A1 * | 2/2002 | Harrison et al. .......... 713/172 |
| 2002/0032862 A1 * | 3/2002 | Harrison et al. .......... 713/173 |
| 2002/0048369 A1 * | 4/2002 | Ginter et al. ............. 380/277 |
| 2002/0054334 A1 * | 5/2002 | Harrison et al. .......... 358/1.15 |
| 2003/0145200 A1 * | 7/2003 | Eden ..................... 713/161 |
| 2007/0171485 A1 * | 7/2007 | Yachida .................. 358/474 |

FOREIGN PATENT DOCUMENTS

| | | |
|---|---|---|
| JP | 2000-215379 | 8/2000 |
| JP | 2001-339543 | 12/2001 |
| JP | 2002-230202 | 8/2002 |
| JP | 2003-29629 | 1/2003 |
| JP | 2003029629 | * 1/2003 |
| JP | 2003-134108 | 5/2003 |
| JP | 2003-318885 | 11/2003 |
| JP | 2004-133821 | 4/2004 |
| JP | 3616601 | 11/2004 |

* cited by examiner

*Primary Examiner*—Eleni A Shiferaw
(74) *Attorney, Agent, or Firm*—Oblon, Spivak, MClelland, Maier & Neustadt, L.L.P.

(57) ABSTRACT

An image forming apparatus configured to generate image data by reading information in a paper, includes a machine signature generation part configured to generate a first electronic signature for the image data by using a secret key peculiar to the image forming apparatus, and an operator signature generation part configured to generate a second electronic signature for the image data by using a secret key peculiar to an operator of the image forming apparatus.

18 Claims, 21 Drawing Sheets

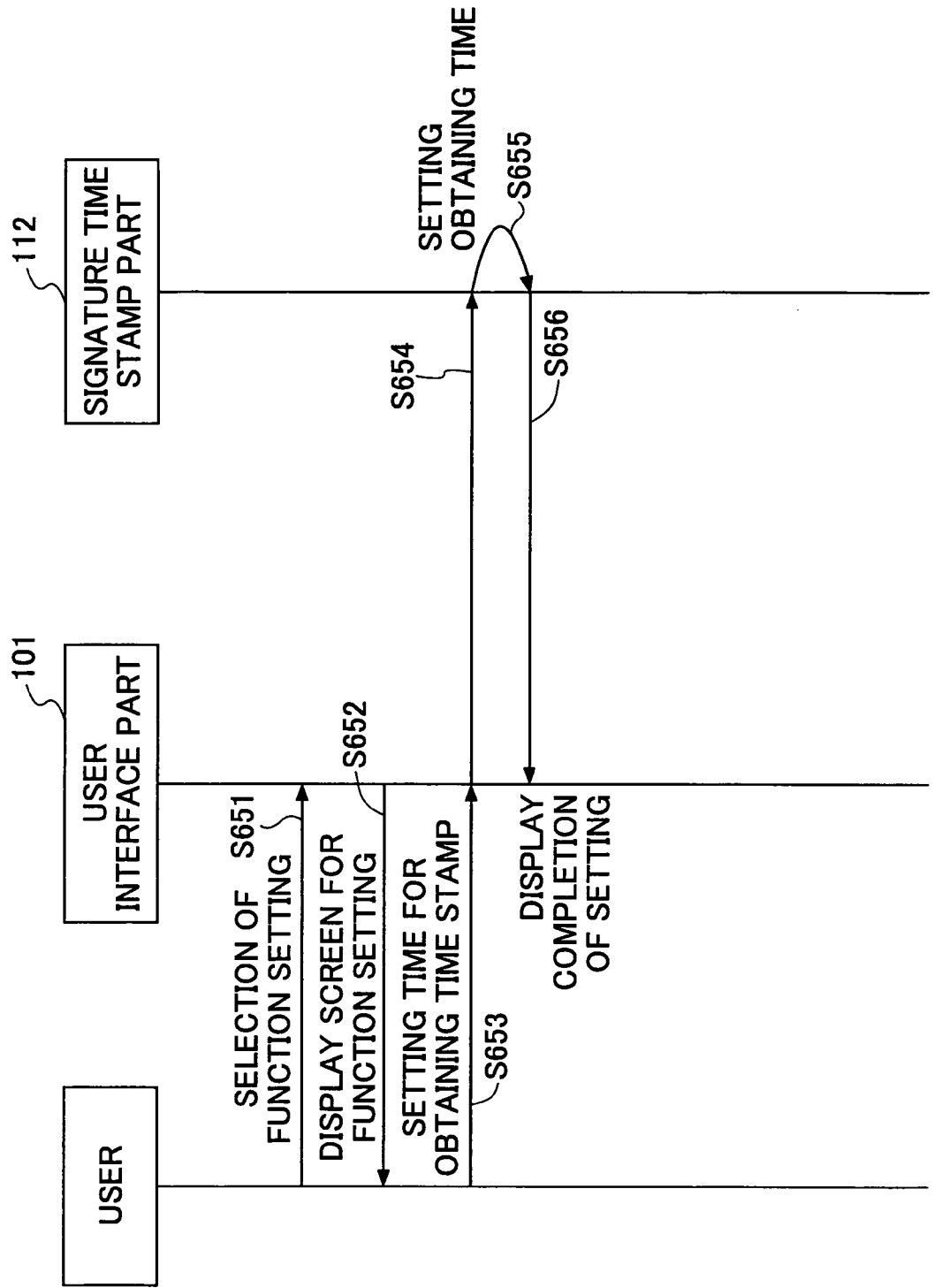

IMAGE FORMING APPARATUS AND ELECTRONIZING METHOD FOR INFORMATION MENTIONED IN PAPER

BACKGROUND OF THE INVENTION

1. Field of the Invention

The present invention relates to image forming apparatuses and electronizing methods (putting into electronic form) for information mentioned (included) in papers, and more specifically, an image forming apparatus generating image data by reading information mentioned in a paper and an electronizing method for information mentioned in a paper.

2. Description of the Related Art

As high computerization in society is improved, it is desired to electronically store a document which had to be conventionally preserved in a paper format, as an electronic document. However, as compared with the paper document, the electronic document has problems such as the electronic document can be tampered with while leaving no trace of the tampering, the electronic document is invisible, and the ability to preserve the electronic document in the long term is degraded. It is not permitted to preserve (designate) the electronic document as an original document without solving the above-mentioned problems. As a method for solving the problems, a system for securing the same originality as the paper document for the electronic document has been proposed and may be spread. See Japan Laid Open Patent Application Publication Nos. 2000-215379, 2002-230202, 2003-224728, 2003-318885, and 2001-339543.

Such a system is used for ensuring originality the same as the paper document for digital data generated by a digital machine such as a personal computer. Therefore, in order to exchange the paper which is originally the original for electronic data, it is necessary to ensure that the contents of the electronic data are the same as the contents of the paper document. This is because the image data may be tampered with or secretly changed to other data after the paper document is scanned, and the paper document may be worked when being scanned so that the contents of the paper document are changed or the paper document itself is secretly changed. Hence, there is a problem in that the image data generated by scanning the paper document has a low value as evidence.

SUMMARY OF THE INVENTION

Accordingly, it is a general object of the present invention to provide a novel and useful image forming apparatus and electronizing method for information mentioned in a paper.

Another and more specific object of the present invention is to provide an image forming apparatus and electronizing method for information mentioned in a paper whereby originalities of image data generated based on information mentioned in a paper (hereinafter "paper information") can be improved.

The above-mentioned object of the present invention is achieved by an image forming apparatus configured to generate image data by reading information in a paper, including:

a machine signature generation part configured to generate a first electronic signature for the image data by using a secret key peculiar to the image forming apparatus; and an operator signature generation part configured to generate a second electronic signature for the image data by using a secret key peculiar to an operator of the image forming apparatus.

The above-mentioned object of the present invention is also achieved by an image forming apparatus configured to generate image data by reading paper information, including:

means for generating a first electronic signature for the image data by using a secret key peculiar to the image forming apparatus; and means for generating a second electronic signature for the image data by using a secret key peculiar to an operator of the image forming apparatus.

According to the above-mentioned image forming apparatus, it is possible to add an electronic signature by the image forming apparatus and an electronic signature by an operator to image data generated based on the paper information. Hence, it is possible to detect tampering with the image data after the paper information is read out by the electronic signature by the image forming apparatus. It is also possible to show that the paper information is electronized without being tampered with by the machine. In addition, it is possible to make the responsibility of a reader clear by including an electronic signature by the operator and therefore to prevent the paper document itself from being tampered with.

The above-mentioned object of the present invention is achieved by an electronizing method for information being mentioned in a paper in an image forming apparatus, including the steps of:

a) generating image data by reading the information mentioned in the paper;

b) generating a first electronic signature to the image data generated in the step a), by using a secret key peculiar to the image forming apparatus; and c) generating a second electronic signature to the image data generated in the step a), by using a secret key peculiar to an operator of the image forming apparatus.

Other objects, features, and advantages of the present invention will become more apparent from the following detailed description when read in conjunction with the accompanying drawings.

BRIEF DESCRIPTION OF THE DRAWINGS

FIG. 21 is a sequence chart for explaining a setting process of timing for obtaining a time stamp of the sixth embodiment of the present invention.

DETAILED DESCRIPTION OF THE PREFERED EMBODIMENTS

A description of the present invention and details of drawbacks of the related art are now given, with reference to FIG. 1 through FIG. 21, including embodiments of the present invention.

First Embodiment

Figure 1:
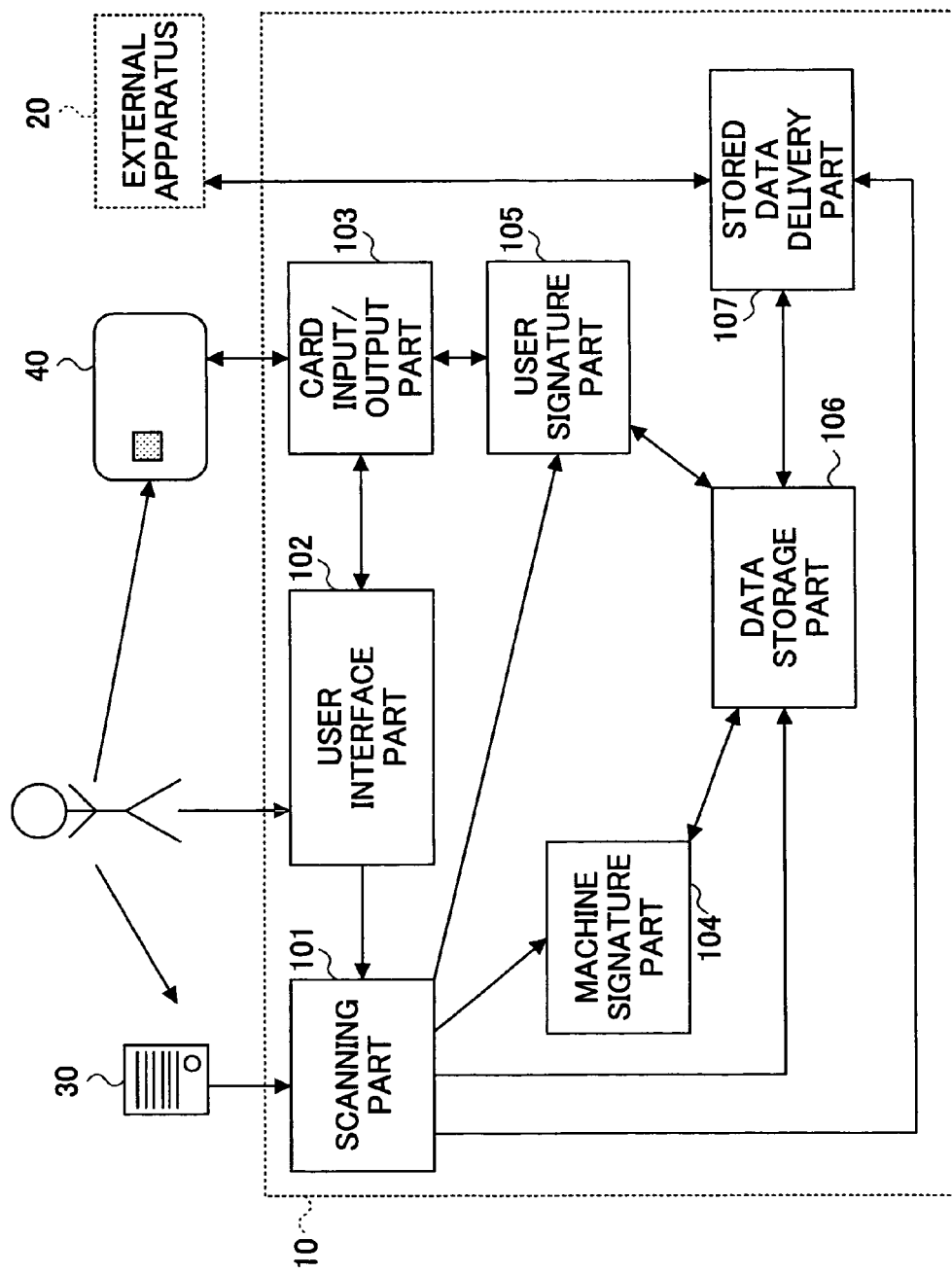
FIG. 1 is a schematic view showing an example of a functional structure of a scanning apparatus of a first embodiment of the present invention.

FIG. 1 is a schematic view showing an example of a functional structure of a scanning apparatus of a first embodiment of the present invention. As shown in FIG. 1, a scanning apparatus 10 includes a scanning part 101, a user interface part 102, a card input/output part 103, a machine signature part 104, a user signature part 105, a data storage part 106, and a stored data delivery part 107.

The scanning part 101 electronizes light and shade information (paper information) on the paper document 30. That is, the scanning part 101 digitizes the paper information by reading the paper information by using an optical method and applies an image format conversion to the digitized information, so that image data are generated in a designated form such as JPEG, TIFF, or PDF.

The user interface part 102 includes input means configured to receive an instruction from a user and an operation screen. The card input/output part 103 implements input and output processes of the information to the IC card 40. The IC card 40 is, for example, distributed to a user. A user secret key, namely an encryption key (secret key) peculiar to the user, and a user public key certificate, namely a public key certificate to the user secret key, are recorded in the IC card 40. The user public key certificate is information where a user public key, namely a public key for the user secret key, and others are included, and is issued in advance by a certifying body.

The machine signature part 104 makes encryption of a MD (Message Digest) generated by applying a Hashing function to the image data, by using a machine secret key, namely an encryption key peculiar to the scanning apparatus 10, so that an electronic signature for the image data is generated. The electronic signature generated by the machine signature part 104 is called, hereinafter, a machine signature.

The user signature part 105 encrypts the MD by using the user secret key so that an electronic signature of the image data is generated. The electronic signature generated by the user signature part 105 is called, hereinafter, a user signature. Strictly speaking, the user signature part 105 causes the IC card 40 where the user secret key is recorded to implement a generation process of the user signature. This is because the user secret key is managed so as not to be taken out from the IC card 40 from the view point of security.

The image data generated by the scanning part 10, the machine signature or the user signature generated by the machine signature part 104 or the user signature part 105, respectively, or the like are stored in the data storage part 106. Furthermore, a machine public key certificate, namely a public key certificate to a machine secret key, is stored in the data storage part 106. The machine public key certificate is information where a machine public key, namely a public key for the machine secret key, and others are included, and is issued in advance by the certifying body.

The stored data delivery part 107 delivers the image data stored in the data storage part 106 to a designated delivery opponent such as an external apparatus 20. Here, the meaning of "deliver" includes file transferring or electronic mail transferring via a network. The stored data delivery part 107 delivers the machine signature to the image data, the user signature, the machine public key certificate and the user public key certificate together with the image data to the designated delivery opponent. The external apparatus 20 stores, for example, the image data generated by the scanning apparatus 10 based on the paper document 30, the machine signature, the user signature, the machine public key certificate, and the user public key certificate, and others. A file server, for example, for opening the image data and others to the user corresponds to the external apparatus 20.

Figure 2:
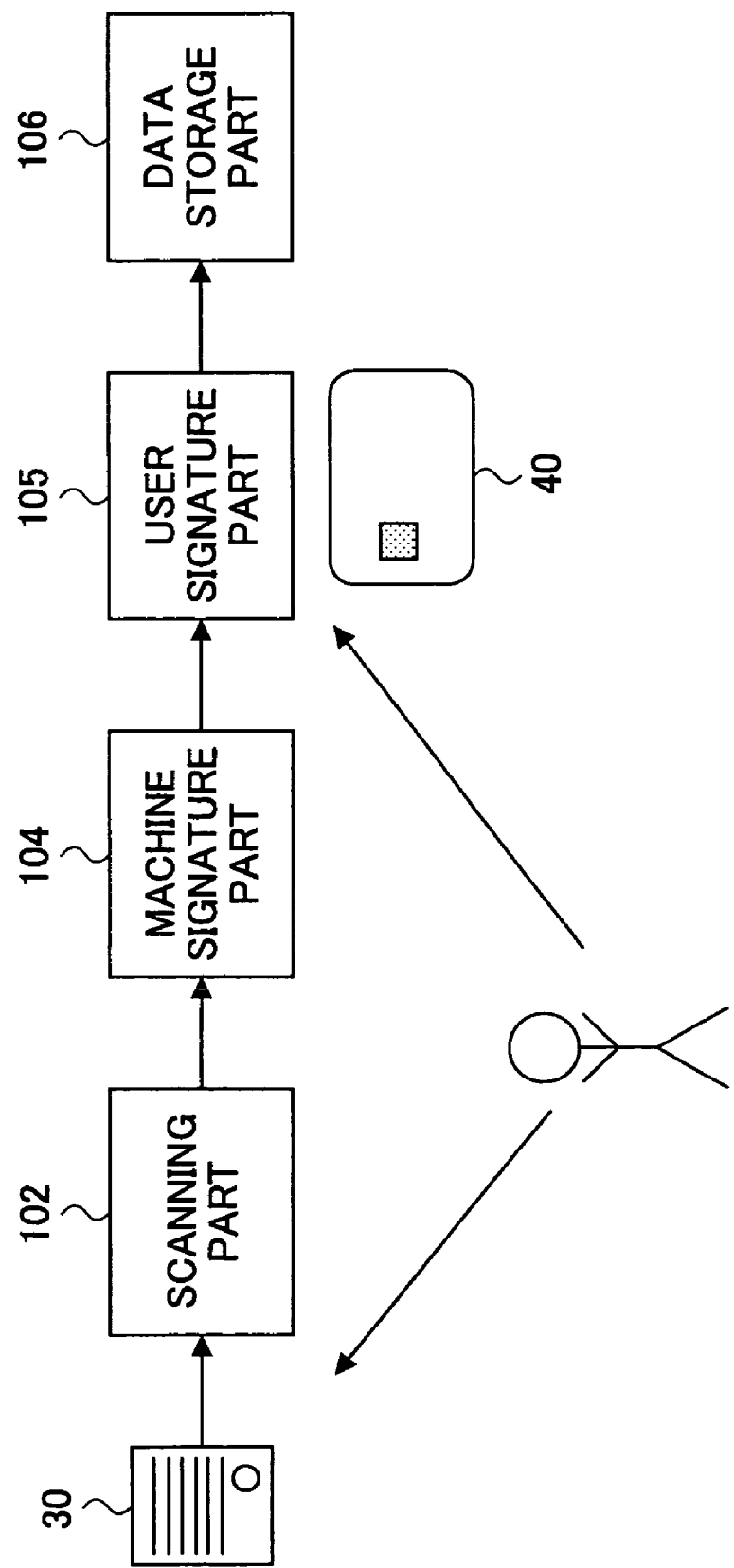
FIG. 2 is a schematic view showing an example of a basic flow of a process of the first embodiment of the present invention.

FIG. 2 is a schematic view showing an example of a basic flow of a process. The image data of the paper document 30 are generated by reading the paper document 30 by the scanning part 102. Based on the image data, the machine signature part 104 and the user signature part 105 respectively generate the machine signature and the user signature. The generated image data, the machine signature, and the user signature are stored in the data storage part 106.

Figure 3:
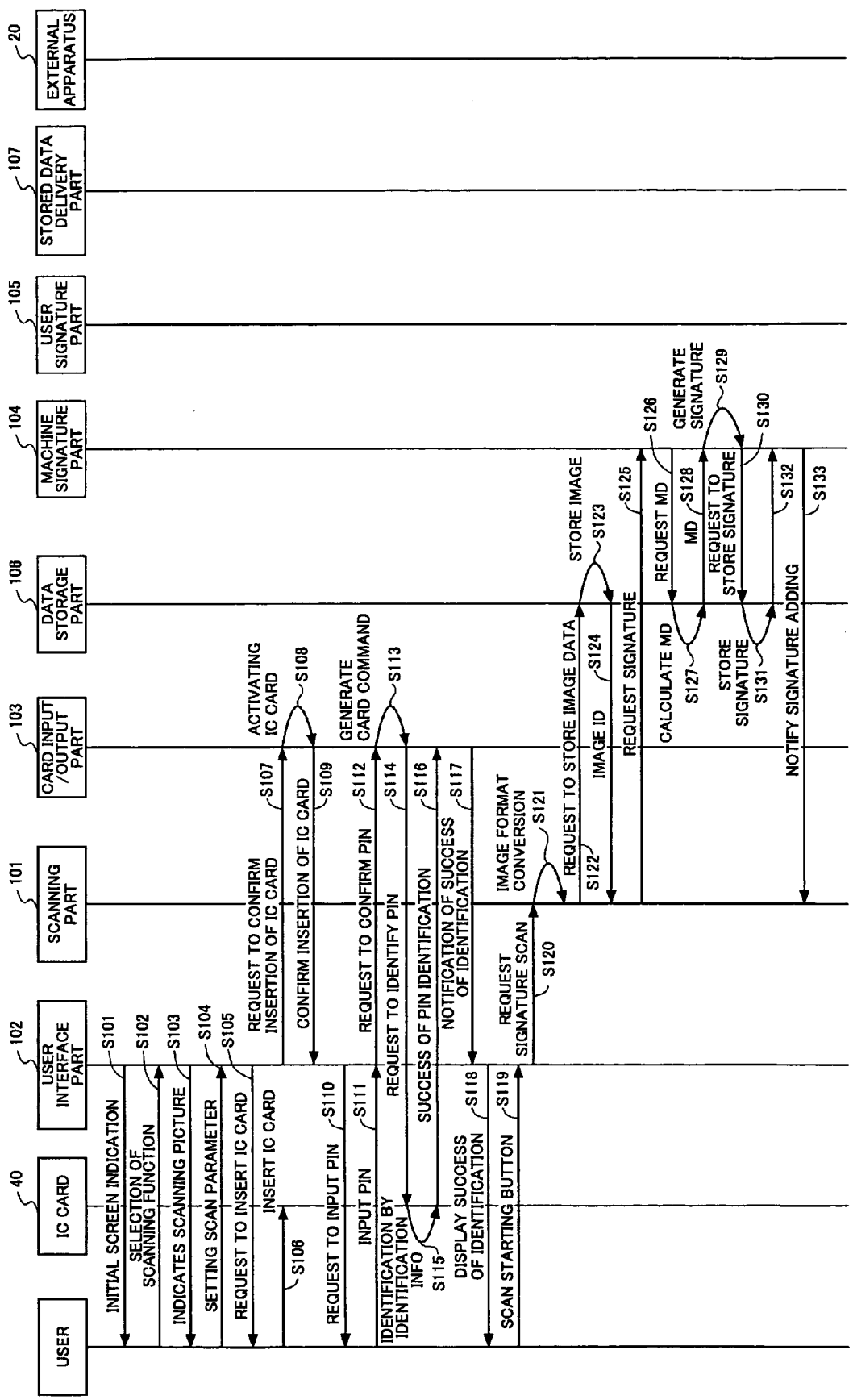
FIG. 3 is a first sequence chart for explaining a scanning process of the first embodiment of the present invention.
Figure 4:
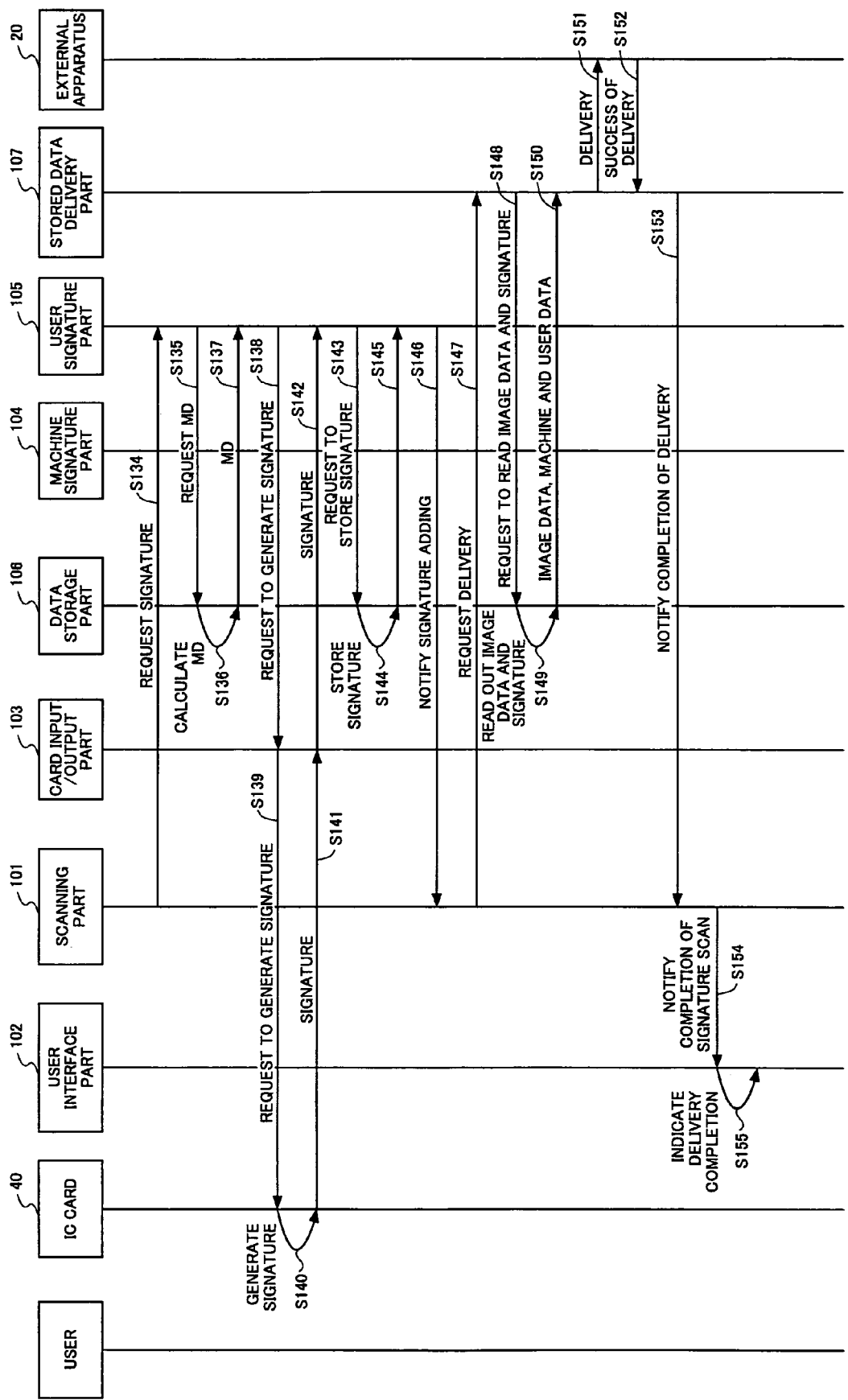
FIG. 4 is a second sequence chart for explaining a scanning process of the first embodiment of the present invention.

Next, a process by the scanning apparatus 10 shown in FIG. 1 is discussed. FIG. 3 is a first sequence chart for explaining a scanning process of the first embodiment of the present invention. FIG. 4 is a second sequence chart for explaining a scanning process of the first embodiment of the present invention.

In an initial screen indicated in an operations panel by the user interface part 102 (S101), if the user selects a scanning function (S102), the user interface part 102 indicates a scanning picture on the operations panel (S103). If the user sets various parameters for scanning the paper document 30 in the scanning picture and a parameter regarding a delivery method of the image data generated based on the scanned information, namely a scan parameter (S104), the user interface part 102 indicates a message for encouraging the user to insert the IC card 40 in the operations panel (S105). Corresponding to the message, the user inserts the IC card 40 into the card input/output part 103 (S106).

After indicating the message for encouraging the user to insert the IC card 40, the user interface part 102 instructs the card input/output part 103 to confirm whether the IC card 40 is actually inserted (S107). The card input/output part 103 confirms that the card 40 is inserted and causes the card 40 to be activated (S108), so as to respond to the user interface part 102 that the insertion of the IC card 40 is confirmed (S109).

After confirming the insertion of the IC card 40, the user interface part 102 indicates a message to encourage the user to input a PIN (Personal Identification Number) (S110). After the user, corresponding to the message, inputs the PIN (S111), the user interface part 102 requests the card input/output part 103 to confirm the PIN. The card input/output part 103 generates a card command requiring the IC card 40 to identify the Pin input by the user (S113), and the card command is input to the IC card 40 (S114).

The IC card 40 implements identification by comparing the PIN input by the user and the PIN recorded in the IC card 40 (S115). In a case where the identification is successful, that the identification is successful is output to the card input/output part 103 (S116). The card input/output part 103 notifies the user interface part 102 that the identification is successful (S117), and the user interface part 102 displays that the identification is successful on the operations panel (S118). In this embodiment, an example of the user identification by using the PIN is discussed. The identification may be implemented by using biometric information such as a fingerprint stored in the IC card 40.

When the user sets the paper documents 30 and pushes a scan start button (S119), the user interface part 102 requests the scanning part 101 to implement scanning the paper document (S120). The scanning part 101 implements scanning the paper document 30 so that the image data in a designated format are generated by performing an image format conversion on the scanned information (S121). The scanning part 101 further requests the data storage part 106 to store the generated image data (S122).

The data storage part 106 stores the image data and assigns an image ID for identifying the image data to the image data (S123) so as to output the image ID to the scanning part 101 (S124). The scanning part 101 requests the machine signature part 104 to generate the machine signature for the image data corresponding to the image ID together with the image ID (S125).

The machine signature part 104 requests the data storage part 106 to generate a MD of the image data corresponding to the image ID together with the image ID (S126). The data storage part 106 specifies the image data as being an object to be processed based on the image ID and generates the MD of the image data by applying hashing function (MD function) to the image data (S127). The data storage part 106 outputs the generated MD to the machine signature part 104 (S128).

The machine signature part 104 generates the machine signature of the image data by encrypting the MD by using the machine secret key stored in the machine signature part 104 (S129). The machine signature part 104 stores the generated machine signature in connection with the machine public key certificate and the image data in the data storage part 106 (S130 through S132). The machine signature part 104 notifies the scanning part 101 that the machine signature is added to the image data (S133). The relating of the machine signature and the machine public key certificate to the image data may be implemented by embedding the machine signature and the machine public key certificate in a head area of the image data or the like in a case where the image data are made, for example, in a data format having an area where the machine signature, the machine public key certificate, and the like are stored in the header area. On the other hand, in a case where there is no area where the machine signature, the machine public key certificate, and the like are stored in the header area, the machine signature and the public key certificate may be stored as a file (for example, a signature file such as PKCS#7) separated from the image data and such relating information may be separately provided.

Based on the generation of the machine signature, the scanning part 101 requests the user signature part 105 to generate the user signature for the image data corresponding to the image ID together with the image ID (FIG. 4: S134). Based on that the user signature part 105 requests the data storage part 106 to generate the MD of the image data together with the image ID (S135), the data storage part 106 generates the image data MD by a process the same as the S127 (S136) so as to output the MD to the user signature part 105.

Based on that the user signature part 105 requests the card input/output part 103 to generate the user signature together with the generated MD (S138), the card input/output part 103 requests the IC card 40 to generate the user signature (S139). The IC card 40 generates the user signature of the image data by encrypting the MD by using the user secret key stored in the IC card 40 (S140), and the generated user signature and the user public key certificate are output to the card input/output part 103 (S141). Based on that the card input/output part 103 outputs the user signature and user public key certificate to the user signature part 105 (S142), the user signature part 105 stores the user signature and the user public key certificate in connection with the image data in the data storage part 106 (S143 through S145), and notifies the scanning part 101 that the user signature is added to the image data (S146). Relating the user signature and the user public key certificate with the image data may be implemented in a way similar to relating the machine signature and the machine public key certificate with the user data. That is, relating the user signature and the user public key certificate to the image data may be implemented by embedding the user signature and the user public key certificate in a head area of the image data or the like in a case where the image data are maintained, for example, in a data format having an area where the user signature, the user public key certificate, and the like are stored in the header area. On the other hand, in a case where there is no area where the user signature, the user public key certificate, or the like is stored in the header area, the user signature and the public key certificate may be stored as a file (for example, a signature file such as PKCS#7) separated from the image data and such relating information may be separately provided.

Since, as discussed above, the generation of the user signature and the machine signature of the image data is completed, the scanning part 101 requests the stored data delivery part 107 to deliver the image data (S147). Based on that the stored data delivery part 107 makes a request for the image data, the machine signature and the user signature of the image data, the machine public key certificate, and the user public key certificate from the data storage part 106 (S148), the data storage part 106 reads out these stored information items (S149) and outputs the read information to the stored information delivery part 107 (S150).

The stored data delivery part 107 delivers the image data, the machine signature and the user signature of the image data, the machine public key certificate, and the user public key certificate to a designated delivery opponent (the external apparatus 20 in this embodiment) (S151). Based on that, the successful delivery is reported by the designated delivery opponent (the external apparatus 20 in this embodiment)

(S152), and the stored data delivery part 107 notifies the scanning part 101 that the delivery is completed (S153). That the scanning process is completed is reported to the user interface part 102 by the scanning part 101 (S154), and the user interface part 102 displays a message about the completion of the delivery of the image data on the operations panel (S155) so that a process based on the scan instruction for the paper document is completed.

In the external apparatus 20 receiving the image data, the image data are not tampered with after being generated by the scanning apparatus 10 can be confirmed by checking the machine signature. In addition, by checking the user signature, it is possible to securely confirm who has conducted the scans. The checking of the machine signature and the user signature can be implemented by comparing a value of the MD obtained by decoding the machine signature or the user signature by the machine public key or the user public key included in the machine public key certificate or the user public key certificate, respectively, and a value of MD obtained by applying the hashing function the same as the hashing function in the scanning apparatus 10 to the received image data. That is, if the values of both the MDs are the same, the originality of the image data is confirmed.

According to the scanning apparatus 10 of the first embodiment, it is possible to apply the electronic signature (machine signature) by the scanning apparatus 10 and the electronic signature (user certification) by the user scanning the paper document, to the image data based on the paper document. Hence, it is possible to ensure that the image data are not tampered with after the image data are generated and that the paper document 30 is not tampered with at the time of scanning. That is, since the machine signature of the image data is generated just after the paper document 30 is scanned and the image data are generated, if the image data are tampered with after the machine signature is generated, it is possible to detect such tampering with the image data by confirming the machine signature. In addition, since the user who scans the paper document 30 can be specified by the user signature, adding the user signature to the image data can prevent illegal activity at the time of scanning. As a result of this, the tampering with the paper document 30 at the time of scanning can be prevented.

In the above discussed embodiment, an example where the stored data delivery part 107 actively implements the delivery is discussed. However, the control of the delivery may be done by the external apparatus 20. That is, the external apparatus 20 may obtain the image data or the like stored in the scanning apparatus 10 by file-transferring at a designated timing.

Second Embodiment

Meanwhile, it is not always necessary to generate the machine signature and the user signature at the same machine. Because of this, an example where a machine for generating the machine signature and a machine for generating the user signature are separately provided is discussed in the second embodiment of the present invention.

Figure 5:
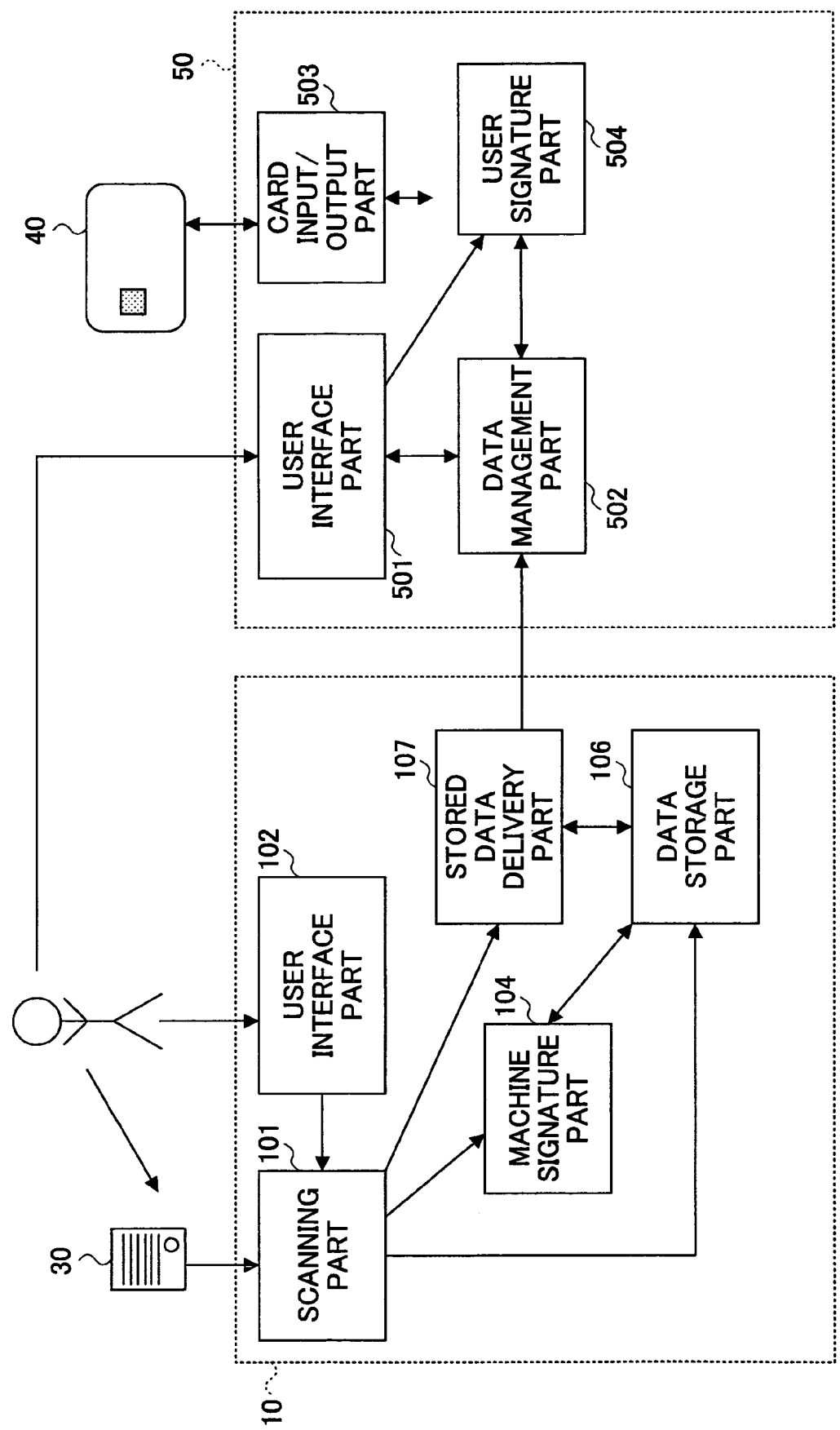
FIG. 5 is a schematic view showing an example of a functional structure of a scanning apparatus and a user signature apparatus of a second embodiment of the present invention.

FIG. 5 is a schematic view showing an example of a functional structure of a scanning apparatus and a user signature apparatus of a second embodiment of the present invention. In FIG. 5, parts that are the same as the parts shown in FIG. 1 are given the same reference numerals, and explanation thereof is omitted. The card input/output part 103 and the user signature part 105 are not included in the scanning apparatus 10 shown in FIG. 5. As described below, the functions of the card input/output part 103 and the user signature part 105 are achieved by the user signature apparatus 50 connected to the scanning apparatus 10 via the network. A main function of the user signature apparatus 50 is the generation of the user signature. The user signature apparatus 50 includes a user interface part 501, a data management part 502, a card input/output part 503 and a user signature part 504. The user interface part 501, for example, receives an input from the user or displays the information for the user. The data management part 502 stores and manages the image data generated by the scanning apparatus 10, the machine signature, and the user signature generated by the user signature apparatus 50. The card input/output part 503 and the user signature part 504 correspond to the card input/output part 103 and the user signature part 105, respectively, shown in FIG. 1. It is not necessary for the user signature apparatus 50 to be an exclusive machine. The user signature apparatus 50 may be realized by an all-purpose computer such as a personal computer.

Figure 6:
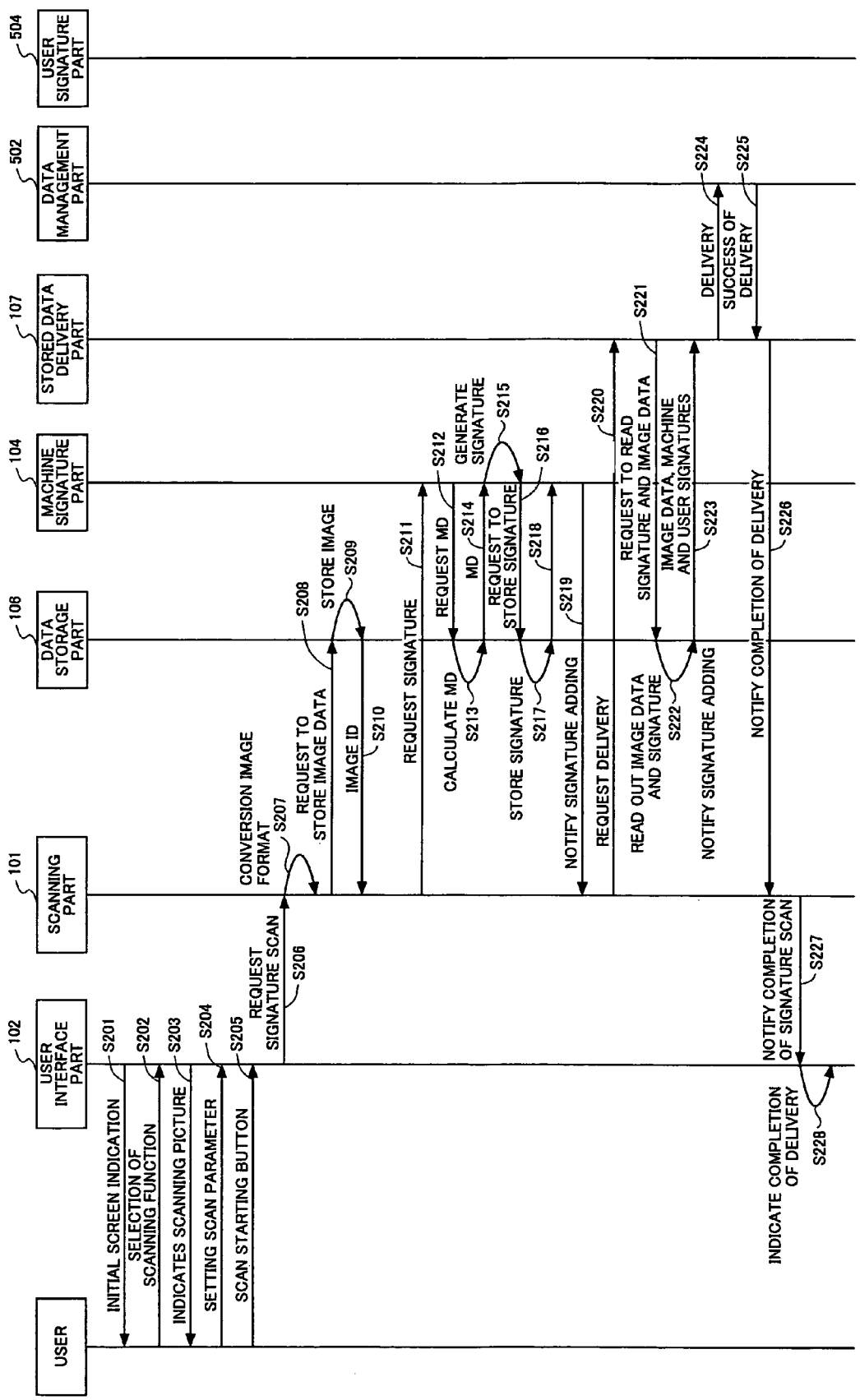
FIG. 6 is a first sequence chart for explaining a scanning process of the second embodiment of the present invention.
Figure 7:
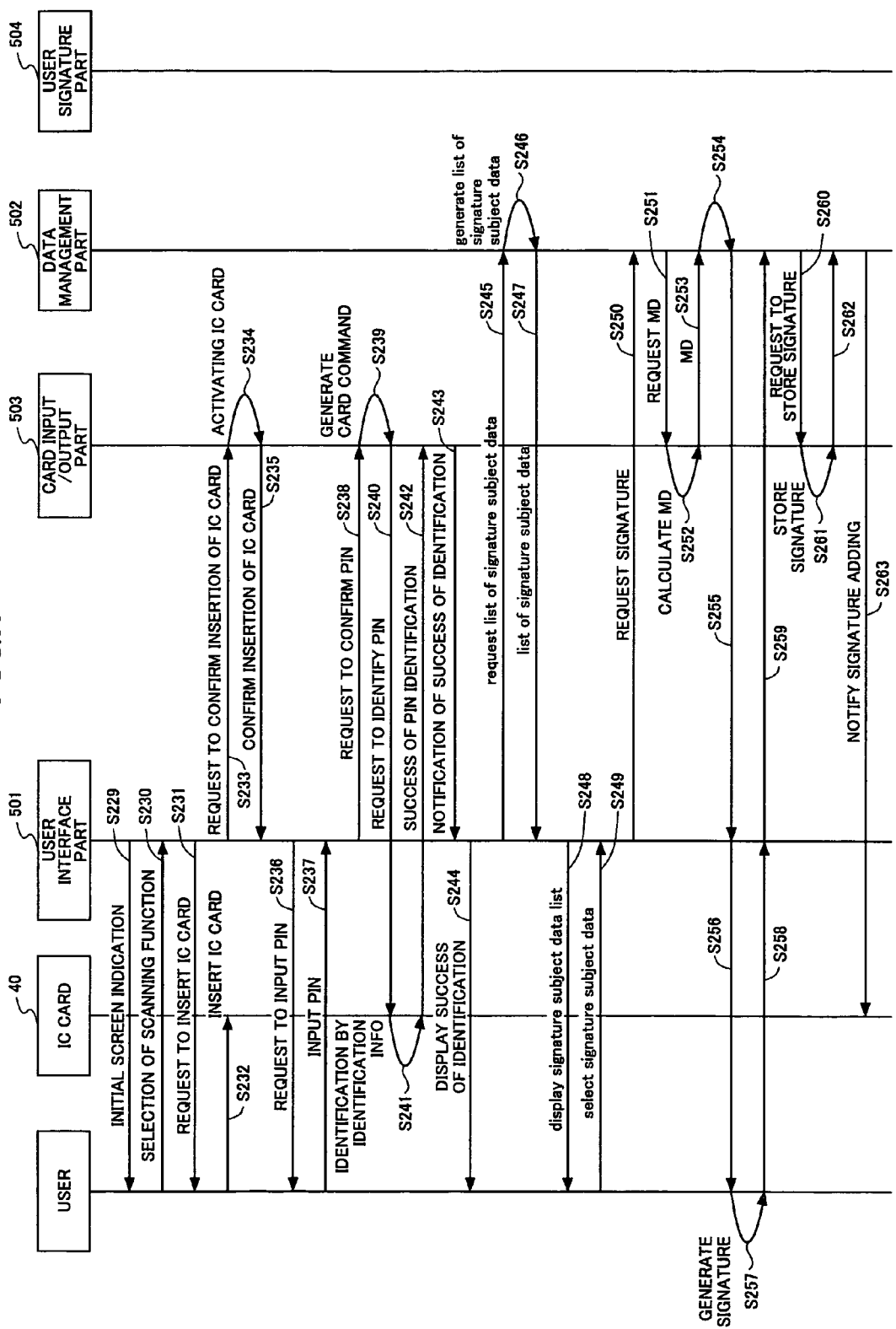
FIG. 7 is a second sequence chart for explaining a scanning process of the second embodiment of the present invention.

Next, a process by the scanning apparatus 10 and the user signature apparatus 50 shown in FIG. 5 is discussed. FIG. 6 is a first sequence chart for explaining a scanning process of the second embodiment of the present invention. FIG. 7 is a second sequence chart for explaining a scanning process of the second embodiment of the present invention.

A flow from a selection of the scanning function on the initial screen to an input of the scan parameter is the same as the flow from the S101 to S104. See S201 through S204 of FIG. 6. However, a flow afterward is different from the flow shown in FIG. 3. That is, as shown in FIG. 6, after inputting the scan parameter, the user pushes a scan start button so that the scanning of the paper document 30 starts (S205). After step S205, in steps S206 through S219, the image data and the machine signature are generated and stored in the data storing part 106 by the same process as the process of steps S120 through S133.

Based on that the scanning part 101 requests the stored data delivery part 107 to deliver the image data (S220), the stored data delivery part 107 requests the image data, the machine signature of the image data, and the machine public key certificate from the data storage part 106 (S221). The data storage part 106 reads the stored information (S222) and outputs the read information to the store data delivery part 107 (S233).

The store data delivery part 107 delivers the image data, the machine signature of the image data, and the machine public key certificate to the data management part 502 of the user signature apparatus 50 (S224). Based on that the data management part 502 stores the received information and responds that the deliver is successful (S225), the stored data delivery part 107 notifies the scanning part 101 that the delivery is completed (S226). Based on that the scanning part 101 notifies the user interface part 102 what the scanning process is completed (S227), the user interface part 102 displays the message about the completion of the delivery of the image data on the operations panel (S228), so that the process performed by the scanning apparatus 10 is completed.

Next, the user performs an operation for adding the user signature to the image data in the user signature apparatus 10 (See FIG. 7). It is not necessary to continuously implement the operation in the user signature apparatus 50 with the operation in the scanning apparatus 10 shown in FIG. 6. For example, the operation in the user signature apparatus 50 may be implemented after the scanning operation for plural paper documents 30 is performed.

Based on that the user selects a signature function in the initial screen displayed at the user signature apparatus 50 by the user interface part 501 (S230), the user interface part 501 displays the message to encourage the user to insert the IC card 40 in the operations panel (S231). Based on that the user inserts the IC card 40 into the card input/output part 503 as corresponding to the message (S232), in steps S233 through S244, the certification of the PIN is implemented by the same process as the steps S107 through S118 of FIG. 3.

In step S245, the user interface part 501 requests the data management part 502 to provide a list of signature subject data, namely image data that may be an object of generation of the user signature. That is, the image data delivered by the scanning apparatus 10 are stored by the process discussed with reference to FIG. 6, in the data management part 502. Therefore, the data management part 502 generates information about a list of the image data items where the user data are not generated among the stored image data items (S246). The information about such a list is output to the user interface part 501 as an information list of the signature subject data items (S247). The user interface part 501 displays the information about the list of the signature subject data items so as to encourage the user to select the image data where the user signature is generated (S248).

Based on that the user selects the image data being the signature subject (S249), the user interface part 501 requests the user signature part 504 to generate the user signature for the selected image data (S250). In steps S251 through S263, the user signature is generated in the same process as steps S134 through S147 of FIG. 4, so that the generated user signature is stored in the data management part 50 in connection with the selected image data.

The Third Embodiment

Figure 8:
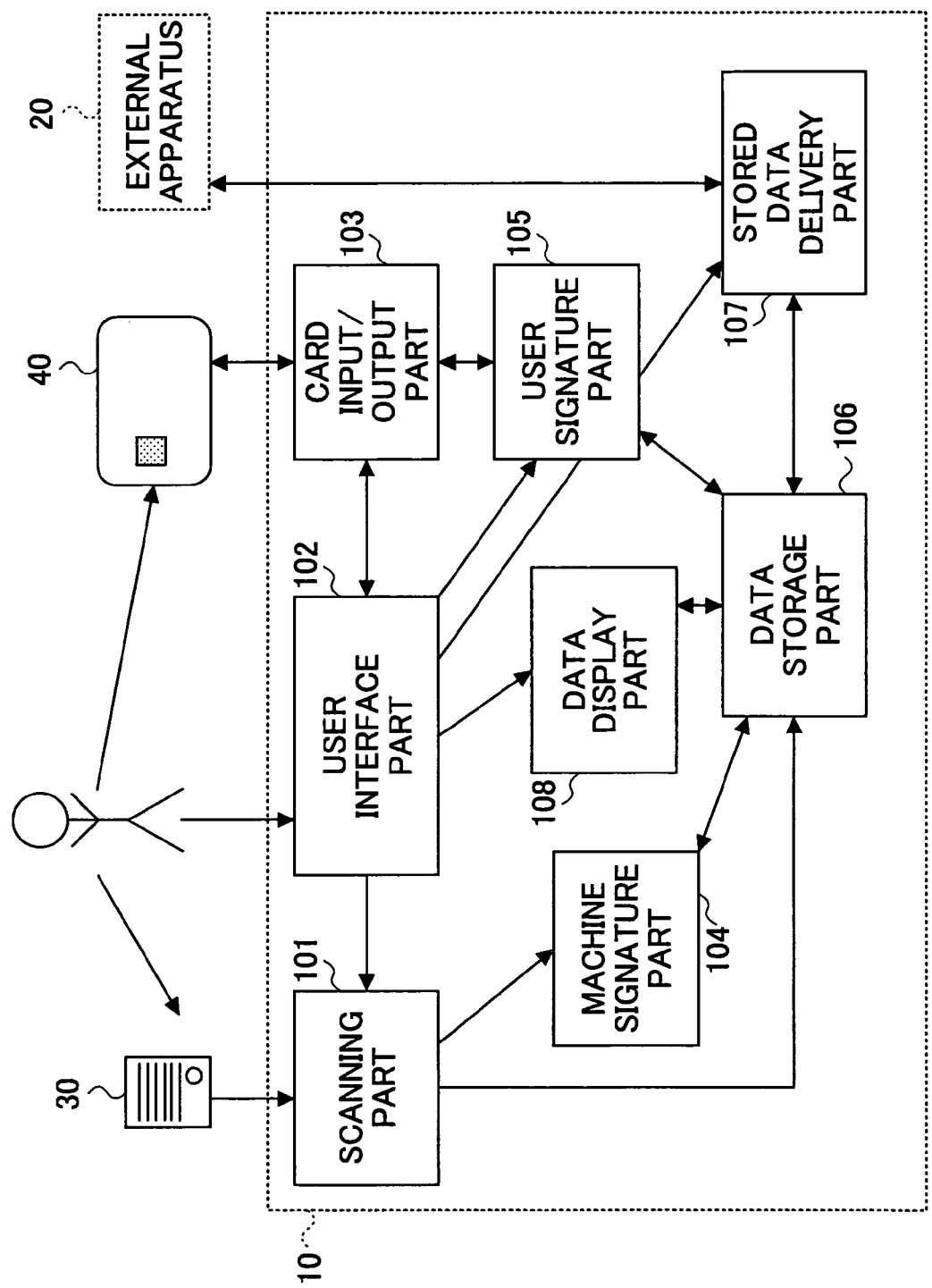
FIG. 8 is a schematic view showing an example of a functional structure of a scanning apparatus of a third embodiment of the present invention.

Next, as a third embodiment of the present invention, an example where the user signature is generated based on the user's confirmation about the contents of the image data obtained by scanning the paper document 30 is discussed. FIG. 8 is a schematic view showing an example of a functional structure of a scanning apparatus of a third embodiment of the present invention. In FIG. 8, parts that are the same as the parts shown in FIG. 1 are given the same reference numerals, and explanation thereof is omitted. A data display part 108 is newly added in the example shown in FIG. 8. The data display part 108 displays the image data stored in the data storage part 106.

Figure 9:
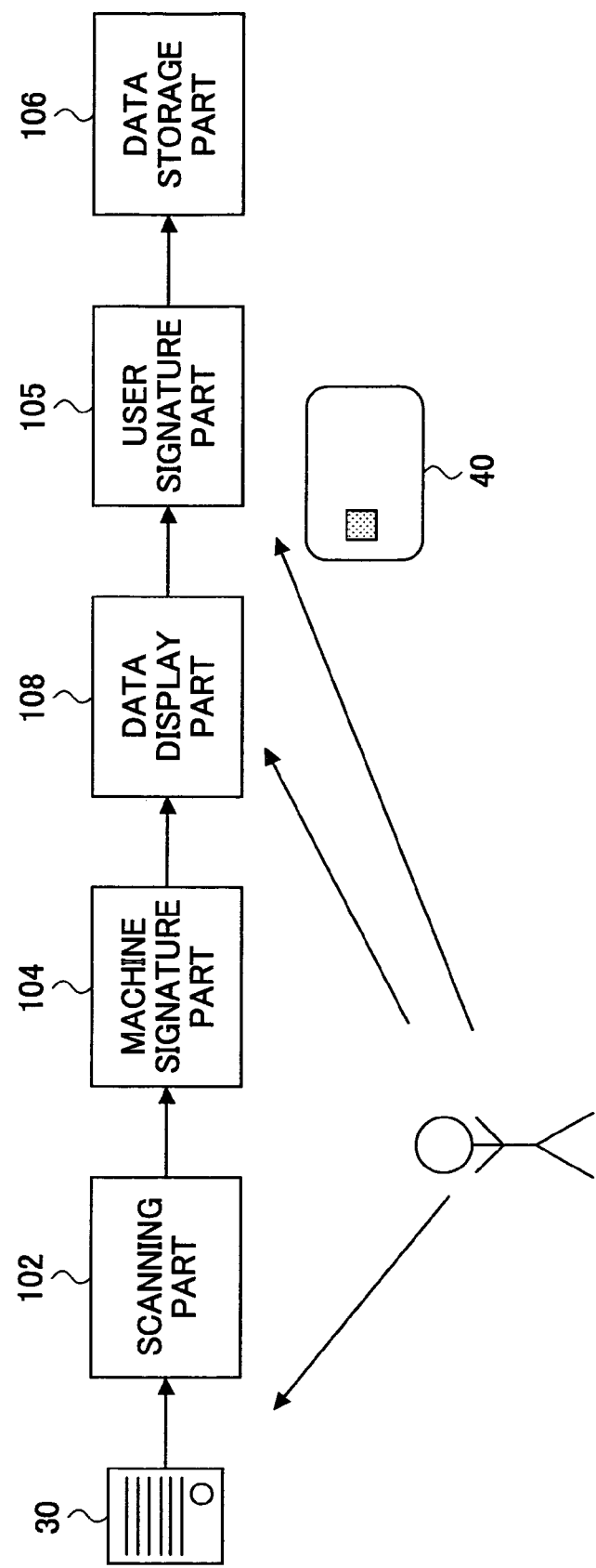
FIG. 9 is a schematic view showing an example of a basic flow of a process of the third embodiment of the present invention.

FIG. 9 is a schematic view showing an example of a basic flow of a process of the third embodiment of the present invention. The image data of the paper document are generated by reading the paper document 30 by using the scanning part 30. After the machine signature is generated based on the image data by the machine signature part 104, the data display part 108 displays the image data so that the contents of the image data are confirmed by the user. In a case where the user confirms the contents of the image data so as to permit the signature, the user signature part 105 generates the user signature based on the image data. The generated image data, the machine signature and the user signature are stored in the data storage part 106.

Figure 10:
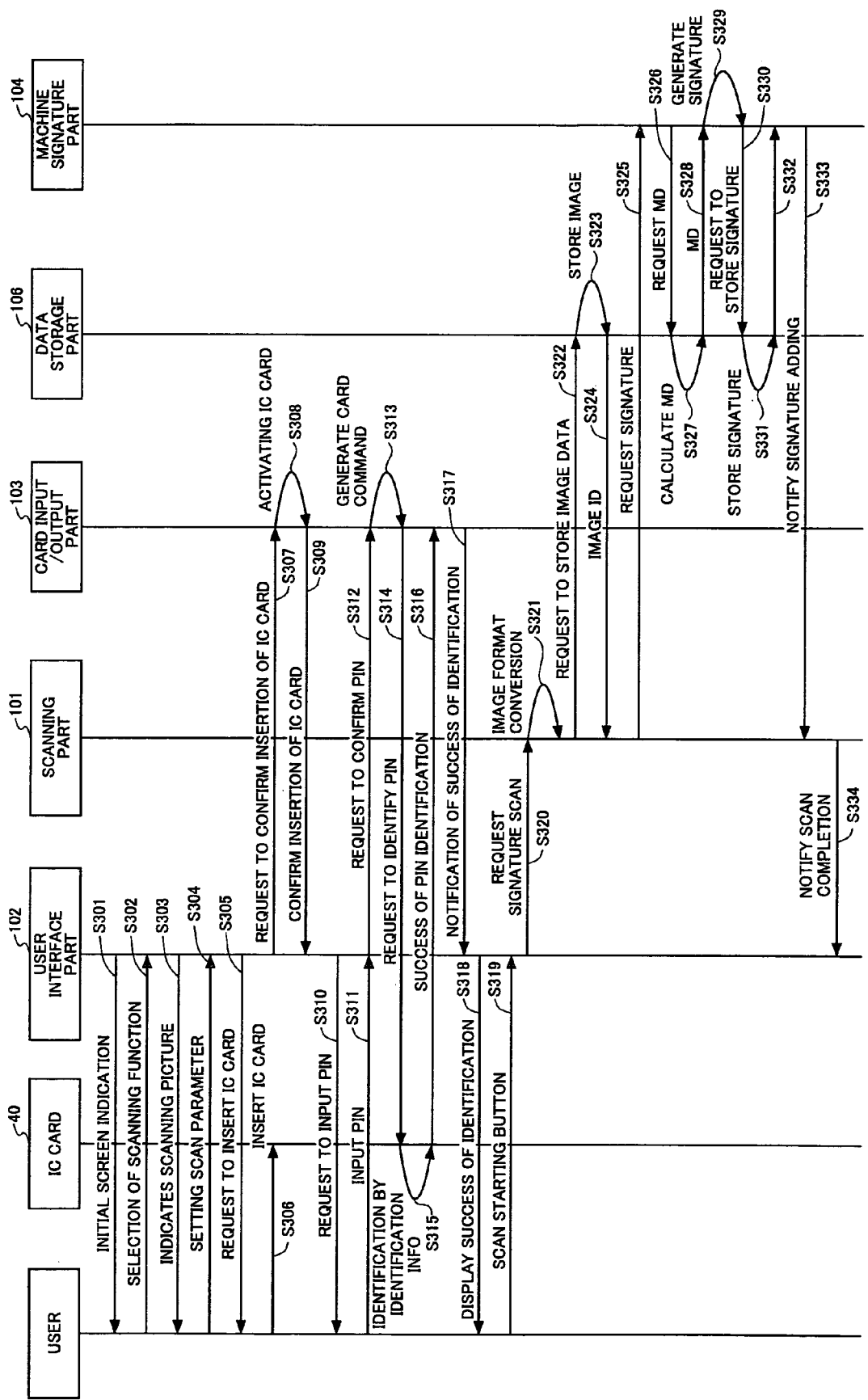
FIG. 10 is a first sequence chart for explaining a scanning process of the third embodiment of the present invention.
Figure 11:
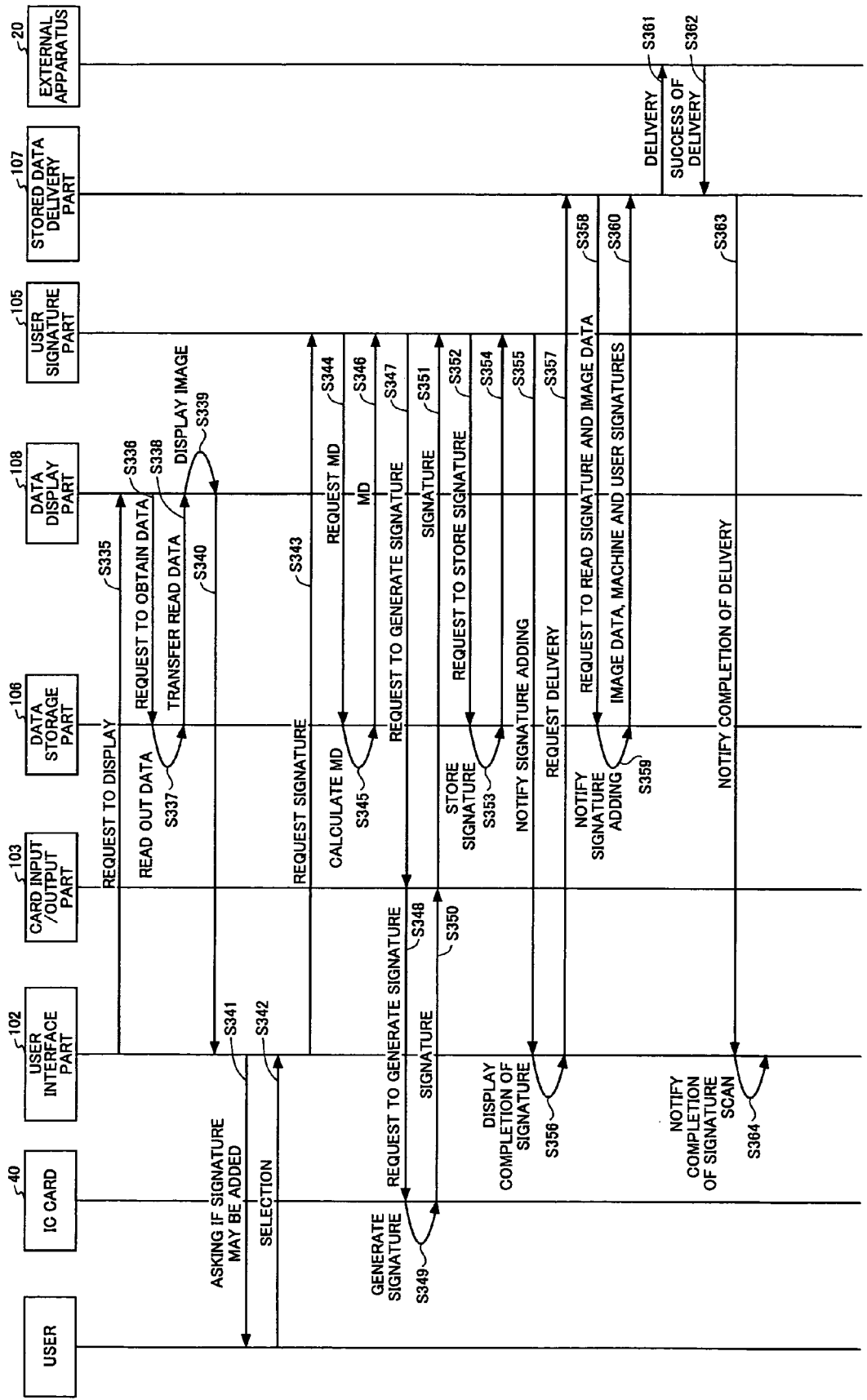
FIG. 11 is a second sequence chart for explaining a scanning process of the third embodiment of the present invention.

Next, the process step of the scanning apparatus 10 shown in FIG. 8 is discussed. FIG. 10 is a first sequence chart for explaining a scanning process of the third embodiment of the present invention. FIG. 11 is a second sequence chart for explaining a scanning process of the third embodiment of the present invention.

In steps S301 through S333, as well as the steps S101 through S133 shown in FIG. 3, the paper document 30 is scanned so that storing the image data and the machine signature are implemented.

The scanning part 101, receiving a report that the machine signature is added to the image data (S333), notifies the user interface part 102 that scanning of the image data is completed (S334), and the user interface part 102 requests the data display part 108 to display the image data (FIG. 11: S335).

Based on that the display part 108 obtains the image data from the data storage part 106 (S336 through S338) so that the image data are displayed (S339, S340), the user interface part 102 displays the message to ask whether the user signature may be added (S341). Based on that the user confirms that the contents of the image data are consistent with the contents of the paper document 30 with reference to the displayed image data, adding the user signature is permitted (S342).

Based on that the user interface part 102 requests the user signature part 105 to generate the user signature (S343), in steps S344 through S355 as well as the steps S135 through S146, the user signature is generated and stored so that when the user signature is completed being added, it is displayed by the user interface part 102 (S356). Furthermore, based on that the user interface part 102 requests the stored data delivery part 107 to deliver the image data (S357), in steps S358 through S362 as well as steps S148 through S152, the image data are delivered.

Based on that the stored data delivery part 107 notifies the user interface part 102 that the delivery is completed (S363), the user interface part 102 displays the message about the completion of the delivery of the image data on the operations panel (S364), so that the process based on the scanning instruction for the paper document is completed.

According to the scanning apparatus 10 of the above-discussed third embodiment of the present invention, the contents of the image data based on the paper document 30 can be confirmed by the user prior to the generation of the user signature. Hence, for example, if a certain paper document is scanned due to an error in the user's operation, such an error can be detected prior to generating the user signature.

Fourth Embodiment

Meanwhile, for electronization of the paper document, it is required to electronize (put into electronic form) the paper document immediately after the original of the paper document is obtained. Therefore, a time gap between the date and time when the original is obtained and the date and time when the document is scanned may be a problem. For example, it can be assumed that some intentional behavior may have happened if the date and time when the document is scanned is prior to or extremely soon after the date and time mentioned in the paper document. On the other hand, it is difficult to prove that the time shown for the machine scanning the paper document is precise. Hence, in the fourth embodiment of the present invention, a sequential number is added to the image data obtained by scanning, and information (for example a serial number) peculiar to the scanning apparatus 10 and the sequential number are included in the signature information, so that the number of the generation of the image data generated by the scanning apparatus 10 is known.

Figure 12:
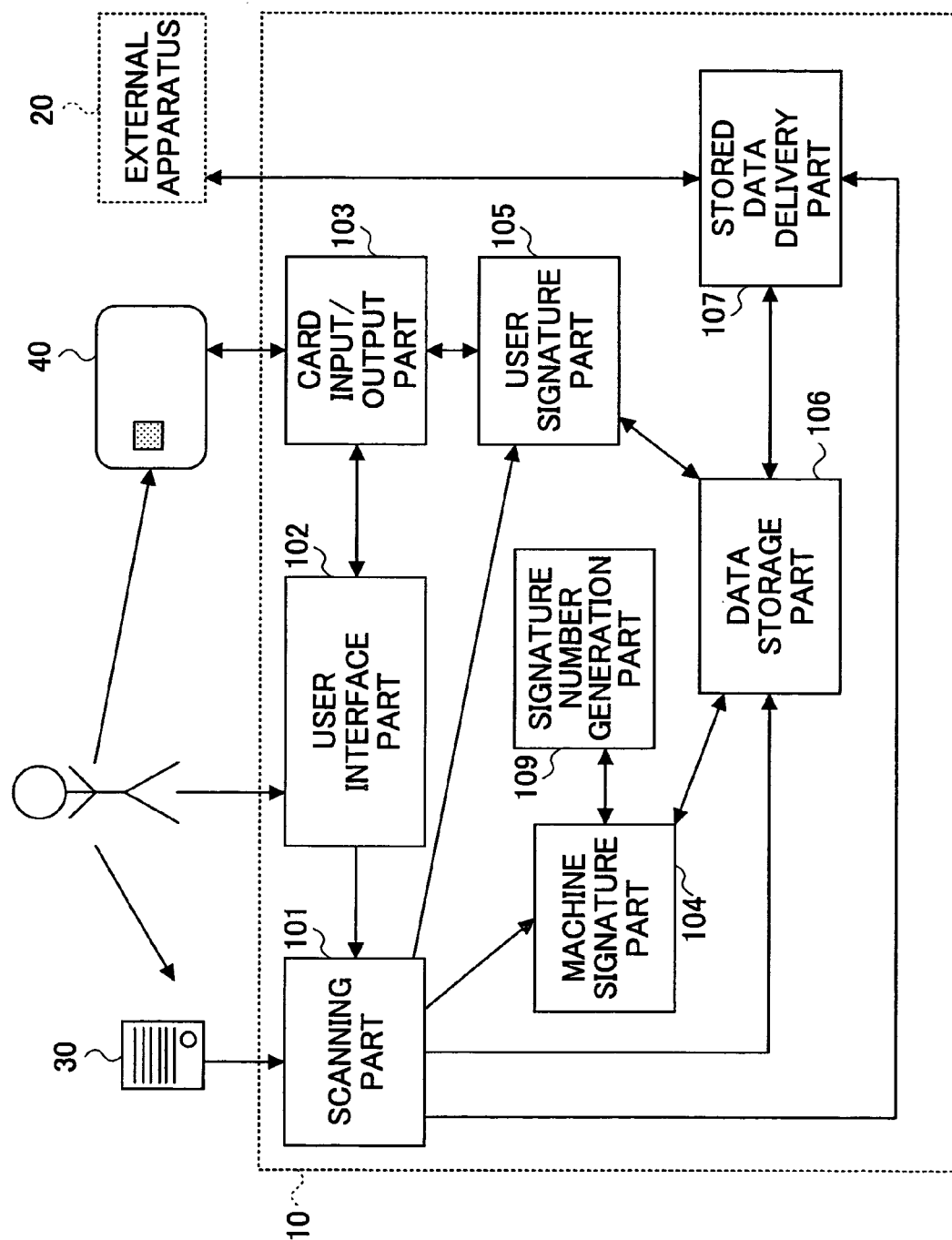
FIG. 12 is a schematic view showing an example of a functional structure of a scanning apparatus of a fourth embodiment of the present invention.

FIG. 12 is a schematic view showing an example of a functional structure of a scanning apparatus of a fourth embodiment of the present invention. In FIG. 12, parts that are the same as the parts shown in FIG. 1 are given the same reference numerals, and explanation thereof is omitted.

A signature number generation part 109 is newly added in the example shown in FIG. 12. The signature number generation part 109 generates the sequential number, namely a signature number, as corresponding to the generation of the image data.

Figure 13:
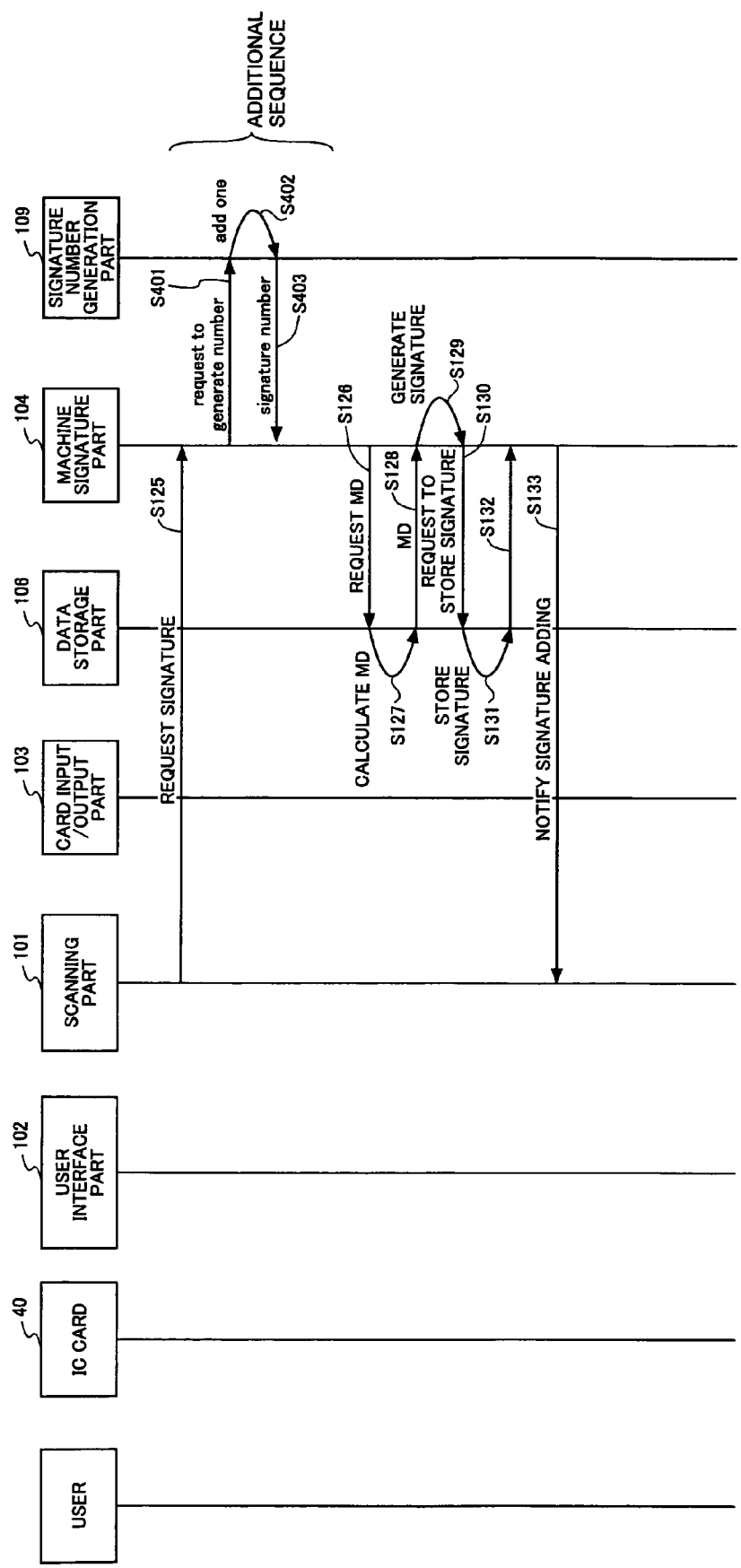
FIG. 13 is a sequence chart for explaining a scanning process of the fourth embodiment of the present invention.

Next, the process step of the scanning apparatus 10 shown in FIG. 12 is discussed. FIG. 13 is a sequence chart for explaining a scanning process of the fourth embodiment of the present invention. The process in the fourth embodiment is substantially the same as the process in the first embodiment. Therefore, only newly added processes and the processes before and after are indicated in FIG. 13.

Steps S125 through S133 of FIG. 13 indicate the processes of the same process numbers as the process numbers of FIG. 3. Steps S401 through S403 indicate the newly added processes. That is, corresponding to the request for the generation of the machine signature (S125), the machine signature part requests the signature number generation part 109 to generate the signature number (S401). The signature number generation part 109 generates the number made by incrementing by one the signature number generated more recently as a new signature number and outputs the new signature number to the machine signature part 104.

The machine signature part 104 generates the machine signature so as to include the signature number generated by the signature number generation part 109 and information peculiar to the scanning apparatus 10. For example, the signature number and the information peculiar to the scanning apparatus 10 may be embedded in the header area of the image data before the MD is generated in the data storage part 106 based on the image data. In this case, the MD is generated based on the image data including the signature number and the information peculiar to the scanning apparatus 10. Furthermore, the machine signature may be generated by encrypting the MD to which the signature number and the information peculiar to the scanning apparatus 10 are added by the machine secret key when the machine signature is generated based on the MD generated by the data storage part 106 (S129).

As described above, according to the scanning apparatus 10 of the fourth embodiment, it is possible to manage the context of the image data generated by the signature number. Therefore, for example, even if a malicious user exchanges past image data with the image data generated by scanning a forged paper document, it is possible to detect such an exchange based on the signature number.

Fifth Embodiment

Meanwhile, in order to improve the date and time when the image data are generated or the signature is given, the time stamp service provided by a third party organization may be used. Accordingly, in the fifth embodiment, the time stamp issued by a time stamp service is added to the image data so that it is possible to prove the time when the image data are generated or the signature is given.

Figure 14:
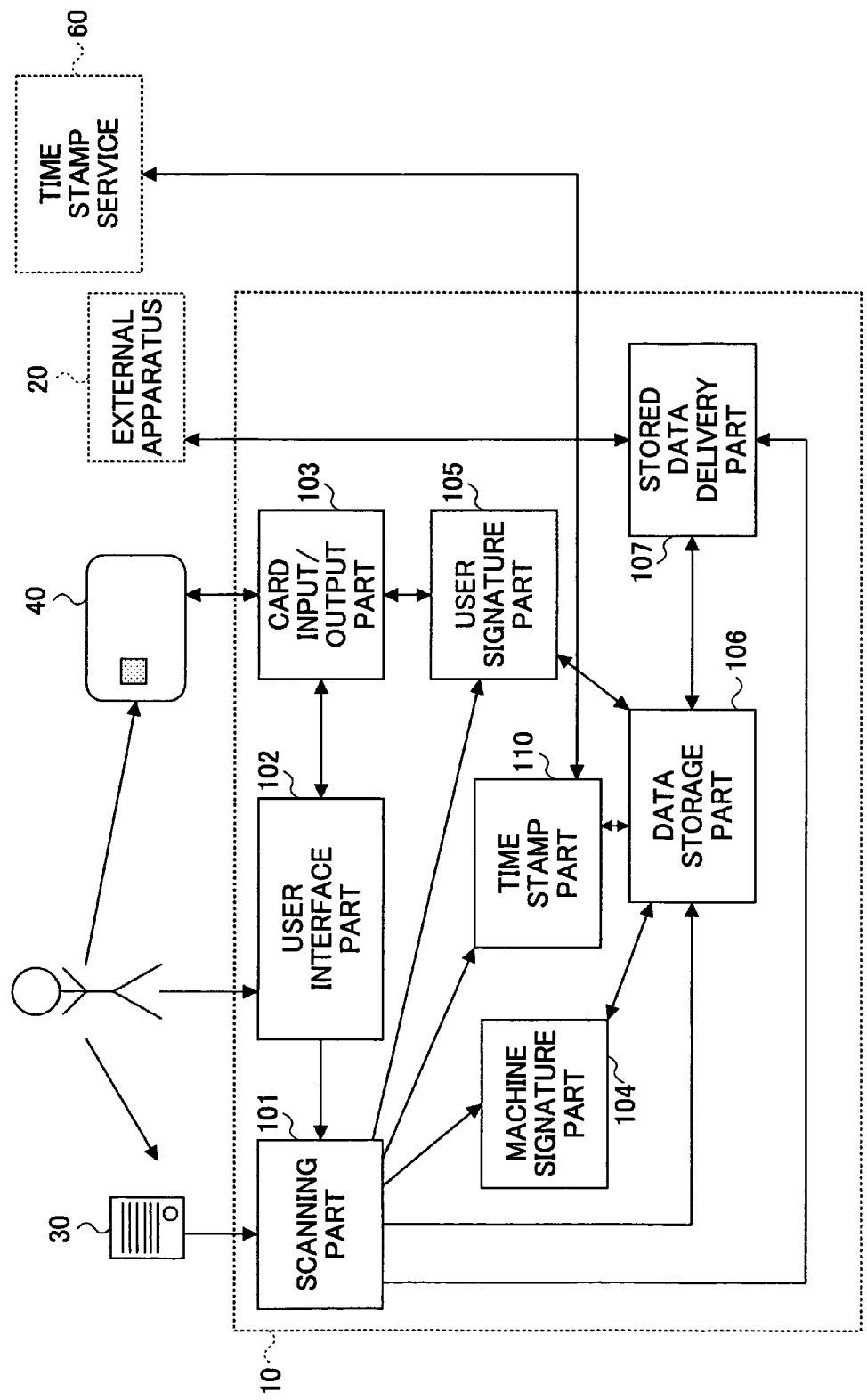
FIG. 14 is a schematic view showing an example of a functional structure of a scanning apparatus of a fifth embodiment of the present invention.

FIG. 14 is a schematic view showing an example of a functional structure of a scanning apparatus of a fifth embodiment of the present invention. In FIG. 14, parts that are the same as the parts shown in FIG. 1 are given the same reference numerals, and explanation thereof is omitted.

A time stamp part 110 is newly added in the example shown in FIG. 12. The time stamp part 110 obtains the time stamp from a time stamp service 60 connecting to the scanning apparatus 10 via a network such as the Internet. The time stamp service 60 realizes a system providing a time stamp service and operated by a third party organization.

Figure 15:
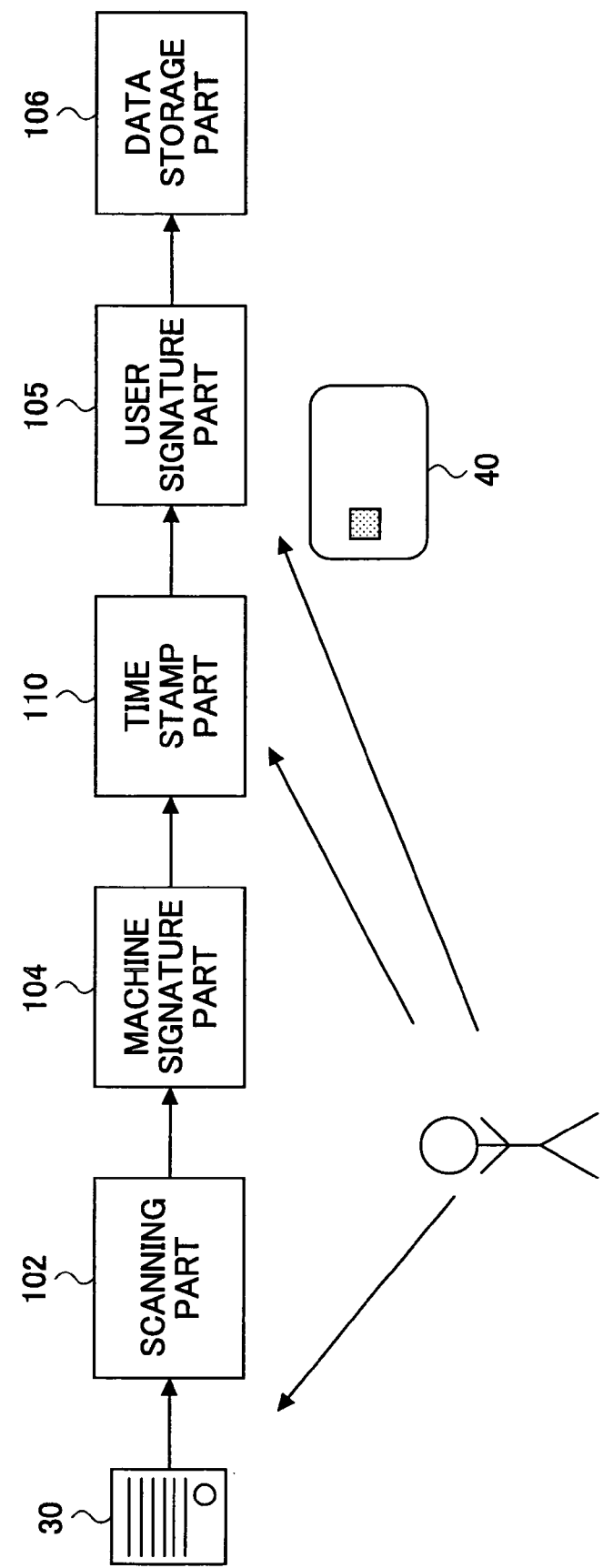
FIG. 15 is a schematic view showing an example of a basic flow of a process of the fifth embodiment of the present invention.

FIG. 15 is a schematic view showing an example of a basic flow of a process of the fifth embodiment of the present invention. The image data of the paper document 30 is generated by the scanning part 102 reading the paper document 30. After the machine signature part 104 generates the machine signature based on the image data, the time stamp part 110 obtains the time stamp from the time stamp service 60 so as to add the time stamp to the image data. The user signature part 105 generates the user signature based on the image data. The generated image data, the machine signature and the user signature are stored in the data storage part 106.

Figure 16:
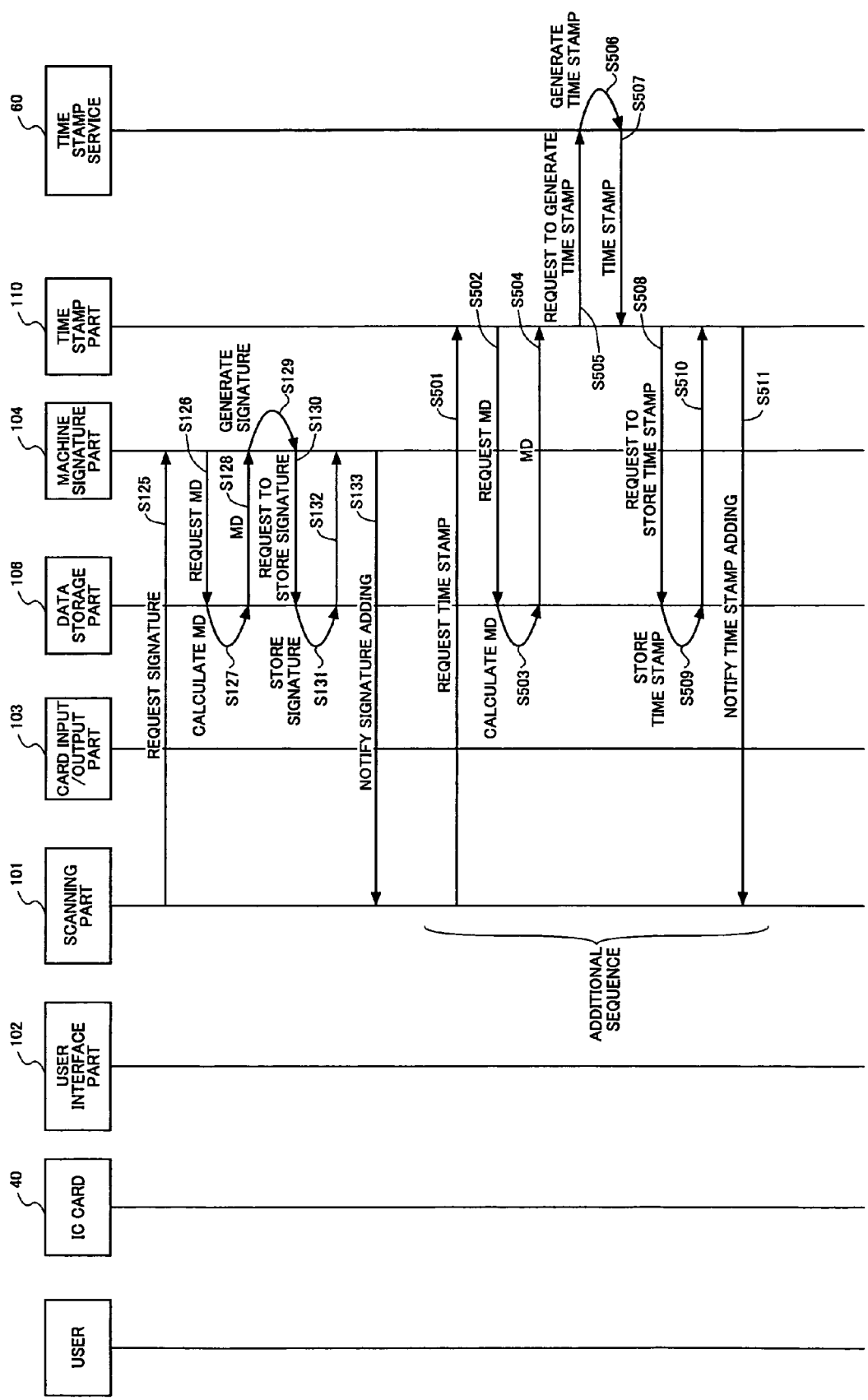
FIG. 16 is a sequence chart for explaining a scanning process of the fifth embodiment of the present invention.

Next, the process step of the scanning apparatus 10 shown in FIG. 14 is discussed. FIG. 16 is a sequence chart for explaining a scanning process of the fifth embodiment of the present invention. The process in the fifth embodiment is substantially the same as the process in the first embodiment. Therefore, only newly added processes and the processes before and after are indicated in FIG. 16.

Steps S125 through S133 of FIG. 16 indicate the processes of the same process numbers as the process numbers of FIG. 3. Steps S501 through S511 indicate the newly added processes. That is, after the machine signature is generated by the machine signature part 104 or the like, the scanning part 101 requests the time stamp part 110 to add the time stamp to the image data (S501). Based on that the time stamp part 110 requests the MD of the image data from the data storage part 106 (S502), the data storage part 106 generates the MD of the image data by the hashing function (S503) so as to output the generated MD to the time stamp part 110 (S504).

Next, based on that the time stamp part 110 requests the time stamp service 60 to generate the time stamp together with the MD (S505), the time stamp service 60 generates the electronic signature (time stamp) by encrypting the MD and the present time by the secret key of the time stamp service 60 (S506) and reports the generated time stamp and the public key certificate to the time stamp part 110 (S507). After that, based on that the time stamp part 110 requests the data storage part 106 to store the time stamp (S508), the data storage part 106 adds the time stamp to the image data and stores the public key certificate of the time stamp (S509, S510). Adding the time stamp to the image data may be implemented by embedding the time stamp in the header area of the image data or by storing the time stamp as a file separate from the image data so that information relating to the image data may be managed.

Based on that the time stamp is added to the image data, the time stamp part 110 notifies the scanning part 101 that the time stamp is added to the image data (S511). After that, the process the same as steps S134 through S155 of FIG. 4 is implemented. Although an example where the time stamp is added after the machine signature is generated before the user signature is generated is discussed in the example shown in FIG. 16, the time stamp may be added after the user signature is generated. Furthermore, it is not always necessary to generate the MD as generated in step S503 in order to generate the time stamp based on the image data. The MD may be generated based on information formed by synthesizing the machine signature, the image data or the machine signature.

According to the scanning apparatus 10 of the fifth embodiment, since the time stamp wherein the time is guaranteed by the third party organization may be added to the image data, it is possible to easily prove the time when the image data are generated.

Sixth Embodiment

Meanwhile, the precision of time proving the existence of the image data does not always have to be in units of seconds but may be in units of days. On the other hand, the time stamp service is generally accounted whenever the time proof is implemented. Hence, when a massive volume of paper documents are electronized, if the time stamp is obtained for every paper document, it costs a great deal. Because of this, in the sixth embodiment, the same time stamp is added to the machine signature and the user signature generated within a designated time period such as a single day.

Figure 17:
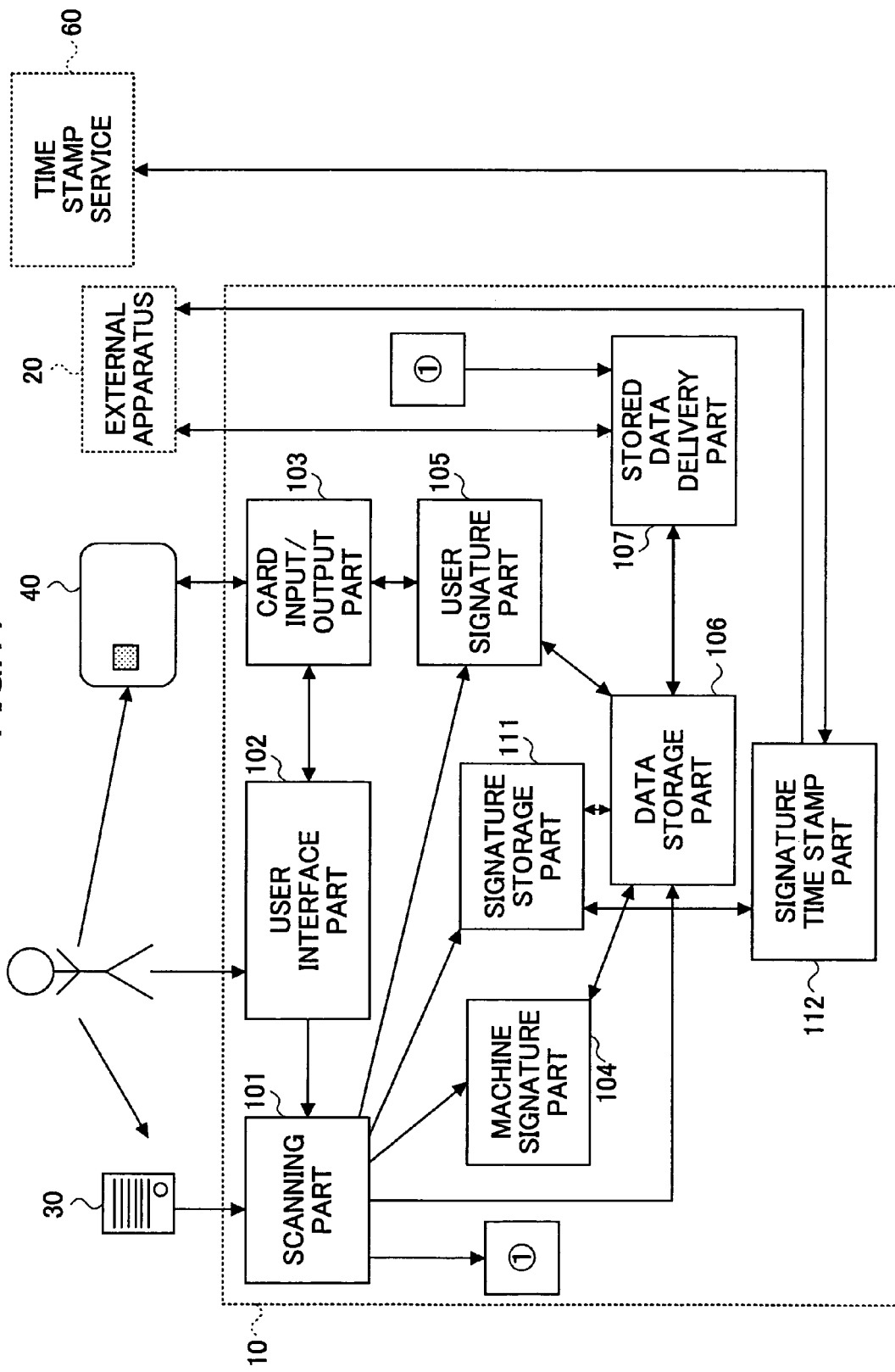
FIG. 17 is a schematic view showing an example of a functional structure of a scanning apparatus of a sixth embodiment of the present invention.

FIG. 17 is a schematic view showing an example of a functional structure of a scanning apparatus of a sixth embodiment of the present invention. In FIG. 17, parts that are the same as the parts shown in FIG. 1 are given the same reference numerals, and explanation thereof is omitted. A time stamp part 112 and a signature storage part 111 are newly added in the example shown in FIG. 17. The signature storage part 111 stores the generated machine signature and the user signature for a certain period of time. The signature time stamp part 112 causes the time service 60 to generate a single time stamp for all of the machine signatures and the user signatures stored in the signature storage part 111 and delivers the time stamp and all of the stored machine signatures and the user signatures to the external apparatus 20.

Figure 18:
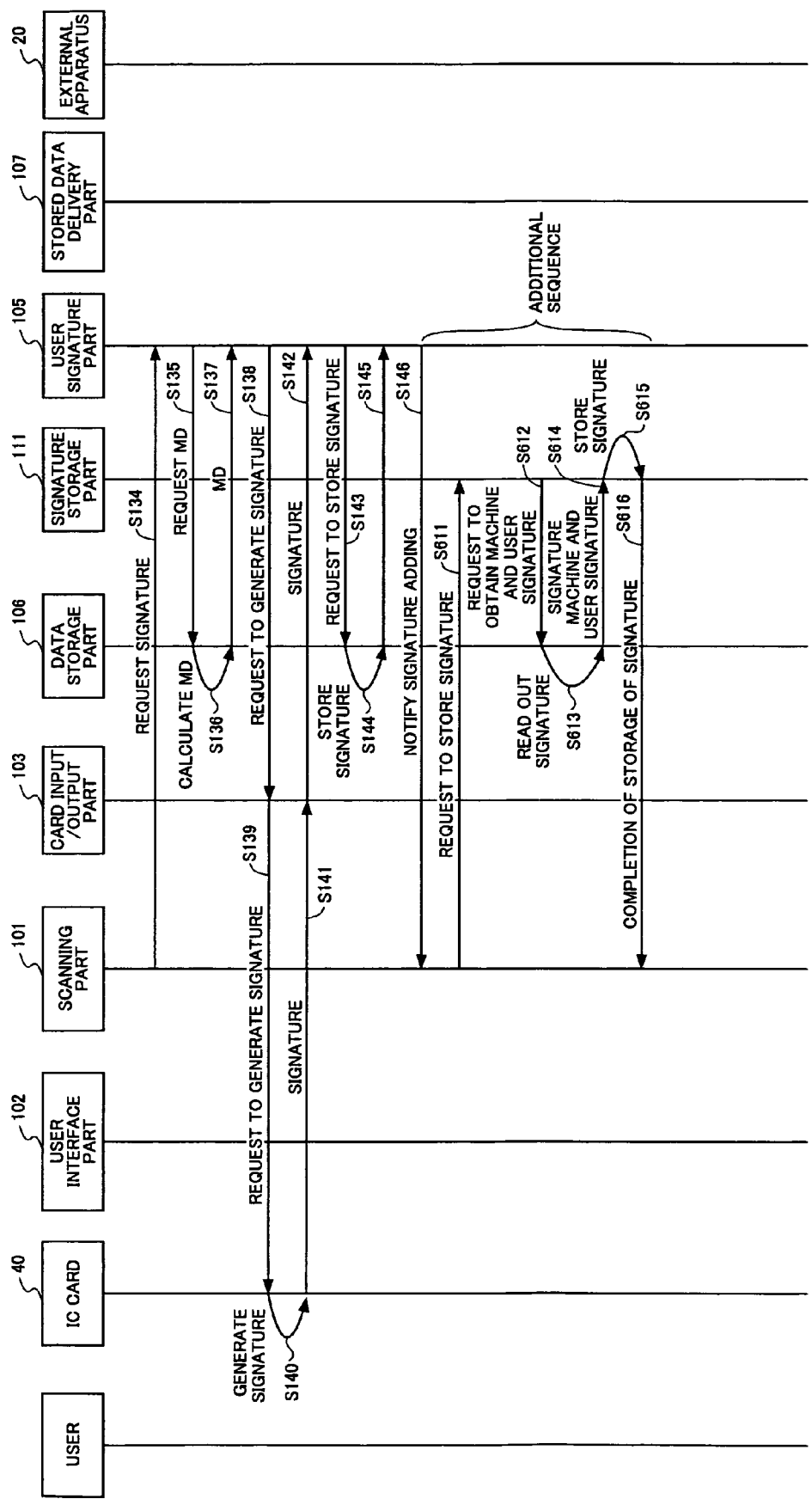
FIG. 18 is a first sequence chart for explaining a scanning process of the sixth embodiment of the present invention.
Figure 19:
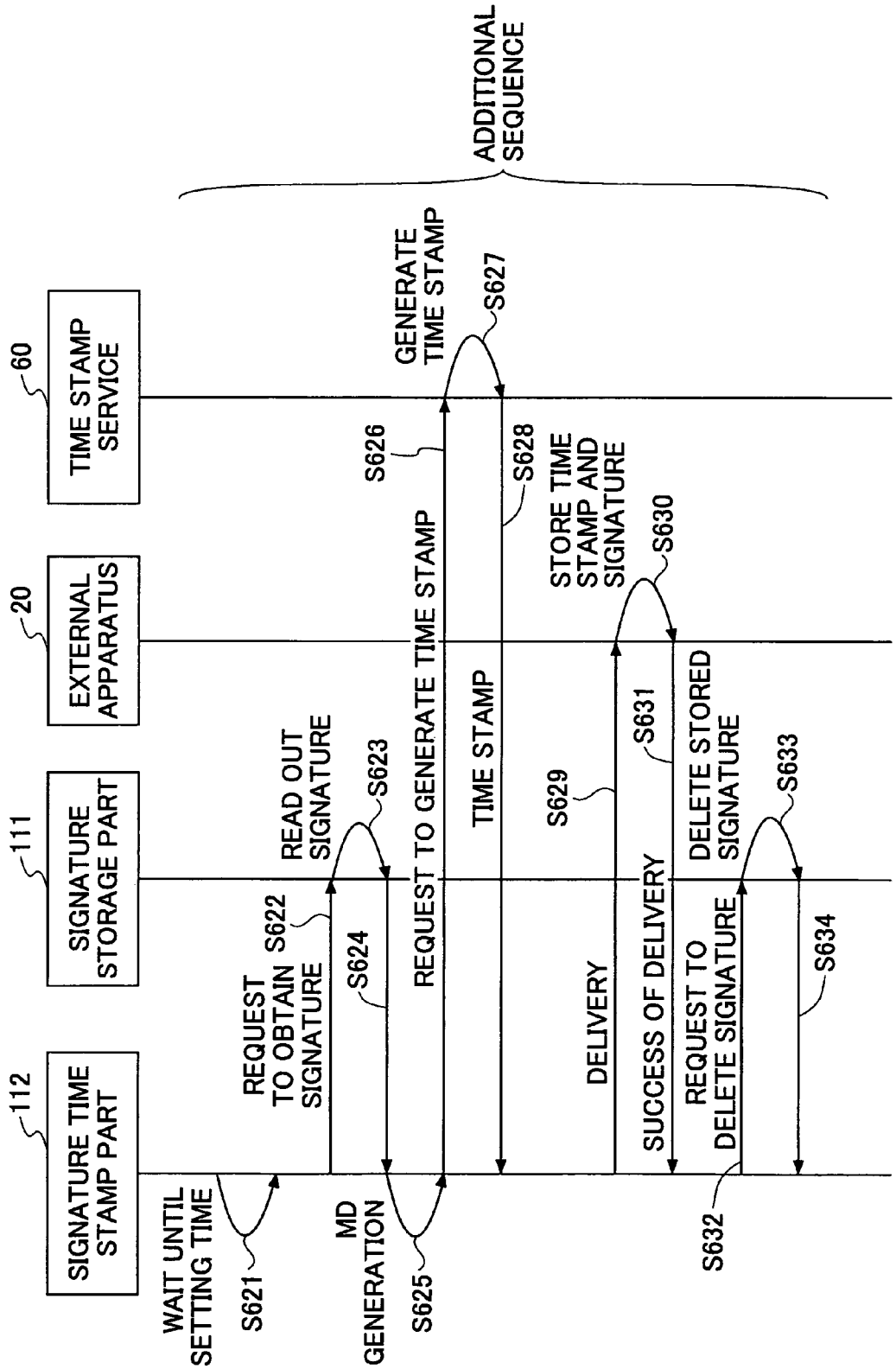
FIG. 19 is a second sequence chart for explaining a scanning process of the sixth embodiment of the present invention.

Next, the process step of the scanning apparatus 10 shown in FIG. 17 is discussed. FIG. 18 is a first sequence chart for explaining a scanning process of the sixth embodiment of the present invention. FIG. 19 is a second sequence chart for explaining a scanning process of the sixth embodiment of the present invention. The process in the sixth embodiment is substantially same as the process in the first embodiment. Therefore, only newly added processes and the processes before and after are indicated in FIG. 18 and FIG. 19.

Steps S134 through S146 of FIG. 18 indicate the processes of the same process numbers as the process numbers of FIG. 4. Steps S611 through S616 and steps S621 through S634 of FIG. 19 indicate the newly added processes. That is, after the user signature is generated by the user signature part 105 or the like, the scanning part 101 requests the signature storage part 111 to store the machine signature and the user signature (S611). Based on that the signature storage part 111 obtains the machine signature and the user signature from the data storage part 106 (S612 through S615) and stores the obtained machine signature and the user signature in the signature storage part 111 (S615), the signature storage part 111 notifies the scanning part 101 that the storage of the machine signature and the user signature is completed (S616). After that, the image data or the like are delivered to the external apparatus 20 by the process the same as steps S147 through S155 of FIG. 4.

On the other hand, the signature time stamp part 112 waits for a preset time (setting time) (FIG. 19: S621), then obtains all of the machine signature and the user signatures stored at the setting time from the signature storage part 111 (S622 through S624) so as to generate a single MD based on all of the machine signatures and user signatures by the hashing function (S625). Based on that the signature time stamp part 112 requests the time stamp service 60 to generate the time stamp with the generated MD (S626), the time stamp service 60 generates the time stamp service, for example, based on the MD and the present time (S627) and reports the generated time stamp and the public key certificate to the signature time stamp part 112 (S628).

Based on that the signature time stamp part 112 delivers the received time stamp and all of the stored machine signatures and user signatures are delivered to the external apparatus 20, the external apparatus 20 stores the image data being already delivered and stored by the steps S147 through S155 in connection with the time stamp delivered by the step S629 and all of the machine signature and user signatures (S630) and reports that the delivery is successful to the signature time stamp part 112 (S631).

The signature stamp part 112 deletes all of the machine signatures and user signatures stored in the signature storage part 111 as a post-process so that a series of the processes are completed.

Figure 20:
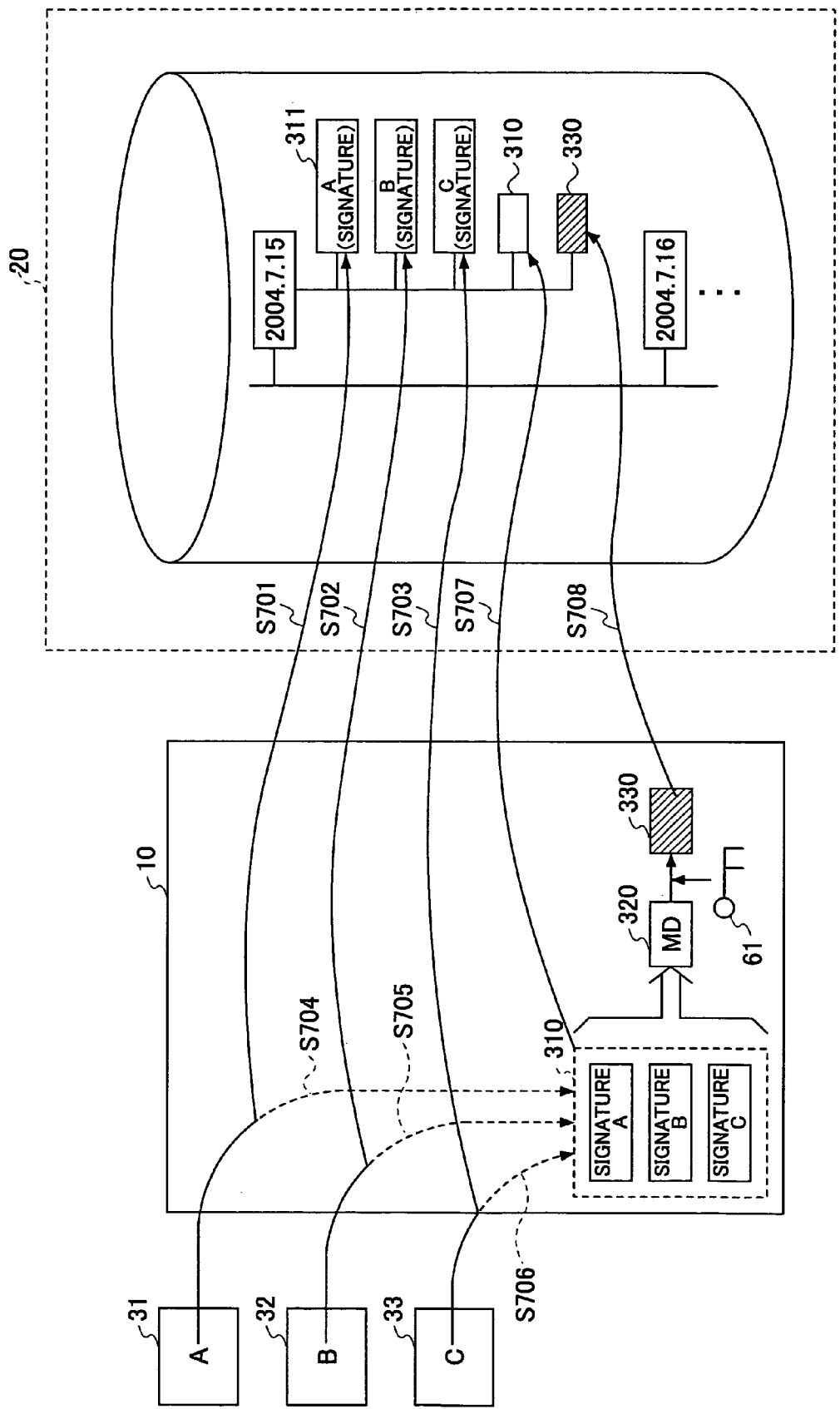
FIG. 20 is a schematic view for explaining details of a process implemented in the sixth embodiment of the present invention.

Next, details of the process mentioned in FIG. 18 and FIG. 19 are discussed with reference to FIG. 20. FIG. 20 is a schematic view for explaining details of a process implemented in the sixth embodiment of the present invention.

In a case where the paper documents 31, 32, and 33 are scanned before the setting time is assumed in FIG. 20, the image data, the machine signature and the user signature generated every time a paper document is scanned are delivered to the external apparatus 20 (S701, S702, S703, respectively) so as to be stored in the file system of the external apparatus 20. The machine signature and the user signature are also stored in the scanning apparatus 10, more specifically the signature storage part 111 (S704, S705, S706, respectively). It is preferable that the image data and the like stored in the external apparatus 20 in the same period of time be stored in the same folder in the external apparatus 20.

When the setting time comes, a single MD 320 is generated based on all of the stored machine signatures and user signatures, namely all signatures 310, by the hashing function, and the time service 60 generates a time stamp 330 based on the MD 320 by the secret key 61 in the time stamp service 60. All the signatures 310 and the time stamp 330 are delivered to the external apparatus 20 and stored in the same folder as the image data delivered before the setting time (S707, S708). In the sixth embodiment, since a single stamp is generated for the image data and the like in a certain period of time, relating both time stamp and the image data and the like is implemented by managing them in the single folder.

For example, if the user uses the image data 311 and wants to verify the time when the image data 311 are generated, the user may obtain the image data 311, the all-signatures 310, and the time stamp 330 from the external apparatus 20. If the MD obtained by decoding the time stamp 330 by using the public key obtained from the time stamp service 60 is consistent with the MD obtained by applying the hashing function to the all-signature 310, it is proven that the all-signatures 310 have not been tampered with and the all-signature 310 did exist at the time of the time stamp 330. If the machine signature and the user signature added in the image data 311 are consistent with the machine signature and the user signature corresponding to the image data 311 in the all-signatures 310, it is prove that the machine signature and the user signature added to the image data 311 did exist at the time of the time stamp 330 and the image data 311 did exist at the time of the time stamp 330.

Meanwhile, the precision of time for proving the existence of the image data depends on the type of business. Hence, it is preferable for the user to set the timing when the time stamp can be optionally obtained. A process for setting the time stamp is shown in FIG. 21. FIG. 21 is a sequence chart for explaining a setting process of timing for obtaining a time stamp of the sixth embodiment of the present invention.

Based on that the user, for example, selects a function setting on the initial screen displayed in the operations panel of the scanning apparatus 10 (S651), the screen function setting for setting a parameter for various function is displayed (S652). Based on that the user sets the timing for obtaining the time stamp on the screen function setting (S653), the user interface part 101 requests the signature time stamp part 112 to set the timing for obtaining the time stamp (S654).

The signature time stamp part 112 sets the timing for obtaining the time stamp to a value set by the user (S655) so as communicate that the setting is completed to the user interface part 101 (S656). After that, in step S622 shown in FIG. 19, the signature time stamp part 112 starts a process for obtaining the time stamp at a newly set timing. A time when the time stamp is obtained may be set as the setting of the timing. An interval from a time when the time stamp is previously obtained such as every other day or every five hours may be set as the setting of the timing.

According to the scanning apparatus 10 of the sixth embodiment, the number for obtaining the time stamp can be controlled and therefore it is possible to guarantee the correctness of the time while the cost is reduced.

The present invention is not limited to the above-discussed embodiments, but variations and modifications may be made without departing from the scope of the present invention.

For example, in the above-discussed embodiment, the file server is used as the external apparatus 20. However, an originality ensuring electronic storage device in an originality ensuring electronic document maintenance service disclosed in Japan Laid-Open Patent Application Publication No. 2004-13488 or a system for securing the originality of an electronic document such as a secure electronic media management system disclosed in Japan Laid-Open Patent Application Publication No. 2003-85046 may form the external apparatus 20. Under this structure, it is possible to effectively protect the image data, the machine signature, the user signature and others delivered by the scanning apparatus 10 and stored in the external apparatus 20 from tampering and deletion.

This patent application is based on Japanese Priority Patent Application No. 2004-213192 filed on Jul. 21, 2004, the entire contents of which are hereby incorporated by reference.

What is claimed is:

1. A scanning apparatus, comprising:
an image capture device to generate image data by reading information of a paper;
an apparatus signature generation part configured to generate an electronic signature of the apparatus for the image data by using a secret key unique to the apparatus and stored in the apparatus;
a user signature generation part configured to generate an electronic signature of a user for the image data by using an IC card secret key unique to the user of the apparatus;
a signature relating part configured to embed the electronic signature of the apparatus to the image data and the electronic signature of the user to the image data in a header data;
a transmitter which transmits the image data, the electronic signature of the apparatus, the electronic signature of the user, a public key certificate of the machine, and a public key certificate of the user to a file server;
a number generation part configured to generate a sequential number based on the generation of the image data; and
a time stamp obtaining part configured to obtain a time stamp for the image data, the electronic signature of the apparatus, or the image data and the electronic signature of the apparatus via a network, the time stamp being an electronic signature generated by encrypting using a secret key of a time stamp service,
wherein the apparatus signature generation part generates the electronic signature of the apparatus based on information where the sequential number is added to the image data.

2. The apparatus as claimed in claim 1,
wherein the secret key unique to the user is recorded in the IC card of the user; and
the user signature generation part generates the electronic signature to the IC card.

3. The apparatus as claimed in claim 1, further comprising:
a displaying part configured to display the image data;
wherein the user signature generation part generates the electronic signature of the user in a case where the generation of the electronic signature of the user for the image data displayed by the displaying part is permitted.

4. The apparatus as claimed in claim 1,
wherein the apparatus signature generation part generates the electronic signature of the apparatus based on information where the sequential number and the information unique to the apparatus are added to the image data.

5. The apparatus as claimed in claim 1, further comprising:
a time stamp obtaining part configured to obtain a single time stamp for the electronic signatures of the apparatus and of the user generated at a designated time.

6. The apparatus as claimed in claim 1, wherein:
the signature relating part relates the electronic signature of the apparatus to the image data, and relates the electronic signature of the user to the image data by embedding the electronic signature of the apparatus and the electronic signature of the user into a head area.

7. A scanning apparatus, comprising:
an image capture device to generate image data by reading information of a paper;
means for generating an electronic signature of the apparatus for the image data by using a secret key unique to the apparatus and stored in the apparatus; and
means for generating an electronic signature of a user for the image data by using an IC card a secret key unique to the user of the apparatus;
means for embedding the electronic signature of the apparatus to the image data and the electronic signature of the user to the image data in a header data;
means for transmitting the image data, the electronic signature of the apparatus, the electronic signature of the user, a public key certificate of the machine, and a public key certificate of the user to a file server;
means for generating a sequential number based on the generation of the image data; and
means for obtaining a time stamp for the image data, the electronic signature of the apparatus, or the image data and the electronic signature of the apparatus via a network, the time stamp being an electronic signature generated by encrypting using a secret key of a time stamp service
wherein the means for generating the electronic signature of the apparatus generates the electronic signature of the apparatus based on information where the sequential number is added to the image data.

8. The apparatus as claimed in claim 7,
wherein the secret key unique to the user is recorded in the IC card of the user; and
the means for generating the electronic signature of the user generates the electronic signature of the user to the IC card.

9. The apparatus as claimed in claim 7, further comprising:
means for displaying the image data;
wherein the means for generating the electronic signature of the user generates the electronic signature of the user in a case where the generation of the electronic signature of the user for the image data displayed by the means for displaying is permitted.

10. The apparatus as claimed in claim 7,
wherein the means for generating the electronic signature of the apparatus generates the electronic signature of the apparatus based on information where the sequential number and the information unique to the apparatus are added to the image data.

11. The apparatus as claimed in claim 7, further comprising:

means for obtaining a single time stamp for all of the electronic signatures of the apparatus and the user which is generated at a same time.

12. The apparatus as claimed in claim 7, wherein:

the means for embedding relates the electronic signature of the apparatus to the image data, and relates the electronic signature of the user to the image data by embedding the electronic signature of the apparatus and the electronic signature of the user into a head area.

13. A method for use with a scanning apparatus, comprising:

a) generating image data by reading the information on the paper using an image reading device of the apparatus;

b) generating an electronic signature of the apparatus for the image data generated in the step a), using a secret key unique to the apparatus and stored in the apparatus;

c) generating an electronic signature of a user for the image data generated in the step a), using an IC card secret key unique to the user of the apparatus;

d) embedding the electronic signature of the apparatus to the image data and the electronic signature of the user to the image data in a header data;

(e) transmitting the image data, the electronic signature of the apparatus, the electronic signature of the user, a public key certificate of the machine, and a public key certificate of the user to a file server;

f) generating a sequential number based on the generation of the image data;

wherein the electronic signature of the apparatus is generated in the step b) based on information where the sequential number is added to the image data and g) obtaining a time stamp for the image data, the electronic signature of the apparatus, or the image data and the electronic signature of the apparatus via a network, the time stamp being an electronic signature generated by encrypting using a secret key of a time stamp service.

14. The method as claimed in claim 13, wherein:

the secret key of the user is recorded in the IC card of the user; and the electronic signature of the user generated in the step c) is written to the IC card.

15. The method as claimed in claim 13, further comprising:

h) displaying the image data generated in the step a);

wherein, in the step c), the electronic signature of the user is generated in a case where the generation of the electronic signature of the user to the image data displayed in the step h) is permitted.

16. The method as claimed in claim 13, wherein the electronic signature of the apparatus is generated in the step b) based on information where the sequential number and the information unique to the apparatus are added to the image data.

17. The method as claimed in claim 13, further comprising:

h) obtaining a single time stamp for the electronic signatures of the apparatus and the user which is generated at a designated time.

18. The method as claimed in claim 13, wherein:

the embedding relates the electronic signature of the apparatus to the image data, and relates the electronic signature of the user to the image data by embedding the electronic signature of the apparatus and the electronic signature of the user into a head area.

* * * * *